(12) United States Patent
Wouhaybi et al.

(10) Patent No.: US 12,233,552 B2
(45) Date of Patent: Feb. 25, 2025

(54) AUTONOMOUS MACHINE COLLABORATION

(71) Applicant: Intel Corporation, Santa Clara, CA (US)

(72) Inventors: Rita H. Wouhaybi, Portland, OR (US); Anahit Tarkhanyan, Cupertino, CA (US); Vinayak Honkote, Bangalore (IN); Rajesh Poornachandran, Portland, OR (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 901 days.

(21) Appl. No.: 17/129,982

(22) Filed: Dec. 22, 2020

(65) Prior Publication Data

US 2021/0107151 A1  Apr. 15, 2021

(51) Int. Cl.
*B25J 9/16* (2006.01)

(52) U.S. Cl.
CPC ........... *B25J 9/1653* (2013.01); *B25J 9/1661* (2013.01); *B25J 9/1674* (2013.01); *B25J 9/1682* (2013.01)

(58) Field of Classification Search
None
See application file for complete search history.

(56) References Cited

U.S. PATENT DOCUMENTS

| 10,126,747 | B1* | 11/2018 | Svec | G01C 21/20 |
| 2018/0275679 | A1* | 9/2018 | Baughman | B25J 9/1661 |
| 2020/0094411 | A1 | 3/2020 | Tan et al. | |
| 2022/0171385 | A1* | 6/2022 | Cui | B60W 60/001 |

FOREIGN PATENT DOCUMENTS

EP    3628454 A1    4/2020

OTHER PUBLICATIONS

European Search Report issued for the corrsponding european patent application No. 21194759, dated Feb. 1, 2022, 2 pages (for informational purposes only).

* cited by examiner

*Primary Examiner* — Jaime Figueroa
*Assistant Examiner* — Arslan Azhar
(74) *Attorney, Agent, or Firm* — Viering, Jentschura & Partner mbB

(57) ABSTRACT

A device including a processor configured to detect an environment of an automated machine, wherein the environment comprises one or more further automated machines; determine an action taken by the one or more further automated machines; determine an action expected of the one or more further automated machines; compares the taken action with the expected action; determine an accuracy score associated with the one or more further automated machines based on the comparison.

19 Claims, 12 Drawing Sheets

AUTONOMOUS MACHINE COLLABORATION

TECHNICAL FIELD

Various aspects of this disclosure generally relate to methods and systems of collaboration among autonomous machines and controllers and code segments thereof.

BACKGROUND

Autonomous machines may be incorporated in industrial environments, manufacturing, and delivery environments to make informed and timely decisions. Multiple autonomous machines may work collaboratively in a group to accomplish a task. The group of autonomous machines may communicate with each other through connected sensors and edge devices to help improve product quality and factory operational efficiency in real time. However, an autonomous machine may need to determine if other autonomous machines in the group are reliable. For example, if an autonomous machine of the group is determined to have a failed temperature sensor, other autonomous machines may avoid using sensor measurements from the failed sensor. The reliability determination may further improve product quality in industrial, medical or any other environment in which autonomous machines cooperate to complete tasks.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings.

DESCRIPTION

Figure 1:
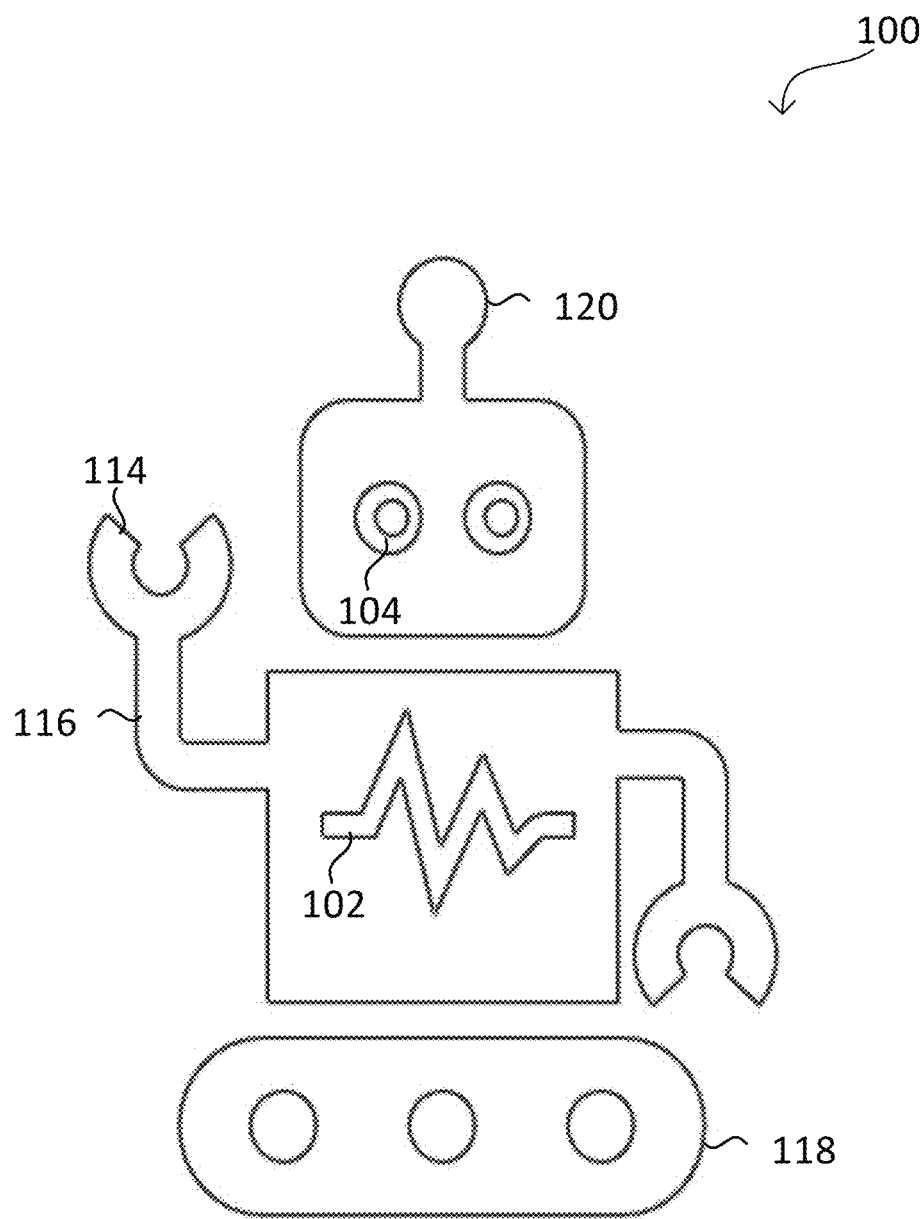
FIG. 1 shows an example of a machine in accordance with various aspects of the present disclosure.

The following detailed description refers to the accompanying drawings that show, by way of illustration, exemplary details and aspects in which the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as used herein may be understood as any kind of technological entity that allows handling of data. The data may be handled according to one or more specific functions that the processor or controller may execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where radio-layer components carry out the physical transmission and reception, such as radio frequency (RF) transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions. The term "calculate" encompasses both 'direct' calculations via a mathematical expression/formula/relationship and 'indirect' calculations via lookup or hash tables and other array indexing or searching operations.

A "machine" may be understood to include any type of mechanical structure that uses (e.g., electrical) power to alter its environment, to apply forces, to control movement and/or to perform an intended action, e.g., a mechanical structure programmable by a computer. By way of example, a machine may be a driven object with a combustion engine, a reaction engine, an electrically driven object, a hybrid driven object, or a combination thereof. A machine may be or may include a humanoid machine, a non-humanoid machine, an agricultural machine, a machine tool, a moving machine, a stationary machine, a drone, an industrial machine, a medical operating machine, a collectively operating machine, a ground machine, an aerial machine, an aquatic machine, or a mixture thereof, among others.

A "ground machine" may be understood to include any type of machine, as described above, which is configured to traverse the solid ground, e.g., within a building, as part of a production line, on a street, on a road, on a track, off-road, etc. An aerial machine may be understood to include any type of machine, as described above, which is configured lift itself, e.g., to fly or hover.

An "aquatic machine" may be understood to include any type of machine, which is configured to travel on, just above the surface or below the waterline. It may float, be a submersible or travel upon the surface of the water as in a hydrofoil.

The term "automated machine" as used herein (also referred to as a at least partially autonomous machine or as robot) may describe a machine capable of managing one or more tasks (also referred to as task performance) at least partially without human intervention, input, and/or control. Examples of the automated machine may include a hybrid machine, a human assisted machine and/or an autonomous machine. The term "autonomous machine" as used herein (also referred to as autonomous robot) may describe a (e.g., automated) machine capable of managing one or more tasks (also referred to as task performance) without human intervention, input, and/or control. Exemplary components of managing task may include: managing one or more physical tasks (also referred to as task management), planning the task performance, organizing the task performance, scheduling the task performance, switching between two tasks, competing for one or more task, assigning one or more tasks, completing one or more tasks, reporting about completion of the one or more tasks, negotiation of the allocation of one or more tasks (e.g., between multiple autonomous machines), monitoring the progress of one or more tasks, navigate the autonomous machine to one or more positions of one or more tasks (e.g., at which the one or more task require a physical manipulation), etc. References made herein to robots or automated machines may be understood as exemplarily and may analogously apply to any type of autonomous machine, and vice versa. References made herein with regard to one or more autonomous machines may analogously apply to one or more automated machines. According to various aspects, the task management may be collaborative, e.g., when multiple robots are allocated to one or more tasks. The robots implementing the collaborative task management may be configured to exchange data related to the task management.

The task performance may include processing one or more workpieces, e.g., by adding material to the workpiece, removing material from the workpiece, transforming the workpiece and the like. The autonomous machine may implement one or more task performance models, e.g., a respective controller of the autonomous machine may implement the one or more task performance models. A task performance model may be configured to control the task performance by the autonomous machine based on input data, e.g., to convert the input data into control instructions. The controller may be configured to transmit the control instructions within the autonomous machine, e.g., in accordance with an in-machine communication protocol (e.g., a fieldbus communication protocol) and/or to one or more actuators of the autonomous machine. Generally, a task performance model may be (e.g., at least in part) rule based and/or may be (e.g., at least in part) based on machine learning.

Examples of the input data may include: data that one or more of the sensors of the autonomous machine sensed, data that the autonomous machine stores (e.g., in a database), data indicating instructions provided to the autonomous machine (e.g., data that an operator or a group leader receives), data about an affiliation of the autonomous machine to a group (also referred to as group affiliation), data about an assignment of the autonomous machine to one or more tasks of the group, data exchanged between multiple autonomous machines (e.g., data transmitted from another autonomous machine of the group), and/or data about a mission (also referred to as mission data). The control instructions may be understood as in-machine instructions to control one or more actuators of the autonomous machine. Examples of the one or more actuators of the autonomous machine may include: one or more actuators configured to cause a motion of the autonomous machine, one or more actuators configured to actuate a tool of the autonomous machine, one or more actuators configured to move the tool (also referred to as effector) of the autonomous machine (e.g., relative to the one or more actuators configured to cause a motion of the autonomous machine), one or more actuators being part of the kinetic chain (e.g., a robotic arm) of the autonomous machine.

For example, the task performance may be based on sensed data (also referred to as sensing result, sensor data, or as sensing data), e.g., measurements by one or more sensors of the autonomous machine or measurements by one or more sensors external to the autonomous machine (e.g., one or more sensors of another autonomous machine). For example, the task performance may be based on information about the environment of the autonomous machine, e.g., information that the one or more sensors of the autonomous machine sensed or information that one or more external sensors sensed. Alternatively, the task performance may be based on a progress of performing one or more tasks that the autonomous machine performs. For example, one or more sensors of the autonomous machine or the one or more external sensors may be configured to sense the progress of performing the one or more tasks that the autonomous machine performs. For example, task performance may include navigating the machine according to one or more positions, at which the machine performs one or more tasks.

Performing one or more tasks may include one or more actions of the autonomous machine, e.g., one or more spatially distributed actions (e.g., a spatial sequence of actions) and/or one or more spatially chronological actions (e.g., in a chronologic sequence of operations). The spatial distribution of multiple actions (also referred to as machine actions) may indicate, where (i.e., with which spatial relation) and/or in which direction the autonomous machine provides the one or more actions, i.e. in which corresponding spatial position (i.e. position and/or orientation) the autonomous machine or its tool is located.

The one or more tasks may be represented (e.g., logically) by data (also referred to as mission data). A mission may refer to one task or a group of multiple tasks, which are related to each other, e.g., contextually or logically related to each other (for example, tasks directed to the fabrication of a certain product, tasks directed to the exploration of a certain are, and the like). The mission data may be a formal representation of the mission. Examples of the mission data may include: data identifying each task (also referred to as task identifier), data organizing each task (e.g., spatial and/or chronological data), data indicating the criteria under which a task is fulfilled, data indicating goals of each task, data identifying criteria for triggering, terminating, or maintaining a task, etc. Furthermore, the mission data may include a mission logic, which logically links tasks, priorities, criteria, conditions and/or tasks and/or which implements a sequence (e.g., a flow chart), according to which the mission is executed. For example, the mission logic may organize the mission hierarchically, e.g., into hierarchical levels, hierarchical groups, subtasks, and the like. For example, a task may include multiple subtasks on a lower hierarchical level, which may be, but not need to be, prioritized, contextual based and/or conditional. Viewed from the hierarchical level of the subtask, the subtask may also be referred to as task, and may include, but not need to include, multiple subtasks. For example, the mission logic may organize the mission in accordance with conditional aspects and/or contextual aspects. For example, the mission logic may define conditional tasks, e.g., by defining conditions/requirements to be fulfilled for starting a task performance and/or for ending a task performance.

Herein the term "collaborate", "collaborative", "collaboration" refers to entities, such as devices (a plurality of autonomous machines), methods and functions, as examples, participating to accomplish a mission. Examples of the collaborative entities may include various types of agents or actors, such as automated machines (e.g., partially of fully autonomous machines), humans, non-automated machines, or non-autonomous machines. Multiple entities (e.g., autonomous machines) participating in the mission may be affiliated (e.g., assigned) to a group (herein also referred to as group, swarm or as team), e.g., being members (also referred to as agents or as nodes) of the group. Multiple autonomous machines participating in the mission may be affiliated (e.g., assigned) to a group of autonomous machines (herein also referred to as group, swarm or as team), e.g., being members (also referred to as agents or as nodes) of the group of autonomous machines. Each group (e.g., of autonomous machines) may be entrusted with one or more missions. References made herein with respect to a group of autonomous machines may analogously apply to a group of entities, e.g., including various types of agents or actors, such as automated machines (e.g., partially of fully autonomous machines), humans, non-automated machines, or non-autonomous machines. The autonomous machine may be configured to collaborate with one or more other autonomous machine, e.g., by implementing one or more protocols (also referred to as collaboration protocols). Examples of collaboration protocols may include: a protocol for group management (also referred to as group management protocol), a protocol for communication (e.g., data exchange) between members of a group of collaborating autonomous machines (also referred to as group communication protocol), a protocol for managing tasks of the mission (also referred to as task management protocol). Generally, a protocol may define rules that indicate the format, syntax, semantics and/or synchronization of information, e.g., of information transfer (e.g., exchange), information storage, information processing, and the like. For example, the autonomous machine may form, join and/or leave a group in accordance with the group management protocol. For example, the autonomous machine may be configured to communicate with other members of the group in accordance with the group communication protocol. For example, the autonomous machine may be configured to exchange sensed data or exchange model data with other members of the group in accordance with the group communication protocol (also referred to as data exchange protocol). For example, a group identifier used to route a message generated in accordance with the group communication protocol to the group. The automated machine may be configured to broadcast the message to all members of the group, and/or a member identifier or topical filter may route the message to individual members of the group. For example, the autonomous machine may be configured to manage the task performance in accordance with the task management protocol, e.g., synchronizing mission data and/or the status (e.g., the progress and/or accomplishment) of one or more tasks of the mission.

The term "target information" may indicate the respective information of interest about the environmental property. The target information may include various types of information about the environment of the sensor, which are based on the sensing process that the sensor performs, e.g., a result thereof. According to various aspects, the target information may include information about one or more logic, geometric, kinematic, mechanical, radiometric (e.g., photometric), thermodynamically, electrical and/or chemical properties of the environment of the sensor, which are based on the sensing process that the sensor performs, e.g., on a result thereof. This is reflected by the type of the target information, which may be a logical type, geometrical type, kinematical type, mechanical type, radiometrical type (e.g., photometric type), thermodynamical type, electrical type and/or chemical type.

The term "result" with regard to a sensing process (also referred to as sensing result or as result of the sensing process) may refer to an interim stage of data that the sensing chain processes and/or to the target information as output of the processing chain. Examples of the sensing result may include: sensor raw data, an aggregation of raw data, pre-processed (e.g., filtered and/or converted) raw data, a quantized result of processing the sensor raw data, e.g., including numerical information about the sensed property (e.g., one or more values of the sensed property), a classified result of processing the sensor raw data, an estimation made based on the raw data (e.g., output of a model), etc. Examples of the result of an image acquisition as sensing process, may include pixel raw data, the image data based on the raw data, a video, the result of an object recognition based on the image data, a spectral composition, a light intensity value, a distance determined based on the image data, etc.

Various aspects herein may utilize one or more machine learning models to perform or control functions of the machine (or other functions described herein). The term "model" used herein may be understood as any kind of algorithm, which provides output data based on input data provided to the model (e.g., any kind of algorithm generating or calculating output data based on input data). A computing system may execute a machine learning model to progressively improve performance of a specific task. In some aspects, parameters of a machine learning model may be adjusted during a training phase based on training data. A trained machine learning model may be used during an inference phase to make estimations or decisions based on input data. In some aspects, the trained machine learning model may be used to generate additional training data. An additional machine learning model may be adjusted during a second training phase based on the generated additional training data. A trained additional machine learning model may be used during an inference phase to make estimations or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify environmental conditions, such as weather conditions and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

For example, the controller of an autonomous machine may be configured to train the task performance model based on training data. The training data may include the control instructions, a result of the task performance (also referred to as actual result) and/or a predefined result (also referred to as expected result or target result). For example, the controller may be configured to determine the result of the task performance by sensing the environment of the machine. For example, the predefined result may represent an optimum result or a range of results that are acceptable. Said more generally, the training data may indicate whether the result of the task performance fulfills a predefined criterion, e.g., by comparing the actual result with the predefined result. For example, the criterion may be fulfilled when a deviation of the actual result from the predefined result is zero.

Generally, the actual result and/or the predefined result may be parameterized, e.g., represented by data (also referred to as result data) including one or more parameters as information about the result. For example, the result data may include sensed parameters, such as physical, electrical and/or chemical properties of the result.

Throughout the present disclosure, the following terms may be used as synonyms: parameter set, model parameter set, safety layer parameter set, automated motion model parameter set, and/or the like. These terms may correspond to groups of values used to implement one or more models for directing an autonomous machine to operate according to the manners described herein.

Furthermore, throughout the present disclosure, the following terms may be used as synonyms: parameter, model parameter, safety layer parameter, and/or automated movement model parameter, and/or the like, and may correspond to specific values within the previously described sets.

As autonomous machines collaborate more and more it is important that they can trust the information they communicate to each other. Trust is difficult to characterize, measure, and communicate. However, it is essential that an autonomous machine can trust and rely on the information it receives or gathers from another autonomous machine in the group. Reliable information allows a group of autonomous machine to successfully work as a team.

It is important that autonomous machines can rely on, or trust, other autonomous machines in an industrial environment. Attacks or multiple entities may not be of concern, but trust may be used to create a framework for using and promoting behavior. For example, if an autonomous had to make many decisions and most of them turned out good, you would want other robots to build their decisions based on what this successful robot is doing and trust its "wisdom". This "wisdom" can be used to create a trust measure for creating reinforcement learning in an industrial environment where a group of autonomous machines observe and rank each other's decision to create a global optimization of their operations.

The trust measure may be implemented using a variety of distributed computing coordination technologies including distributed ledgers, publish-subscribe and mesh for reputation management, provenance, record keeping, search and future queries/audit.

Figure 5:
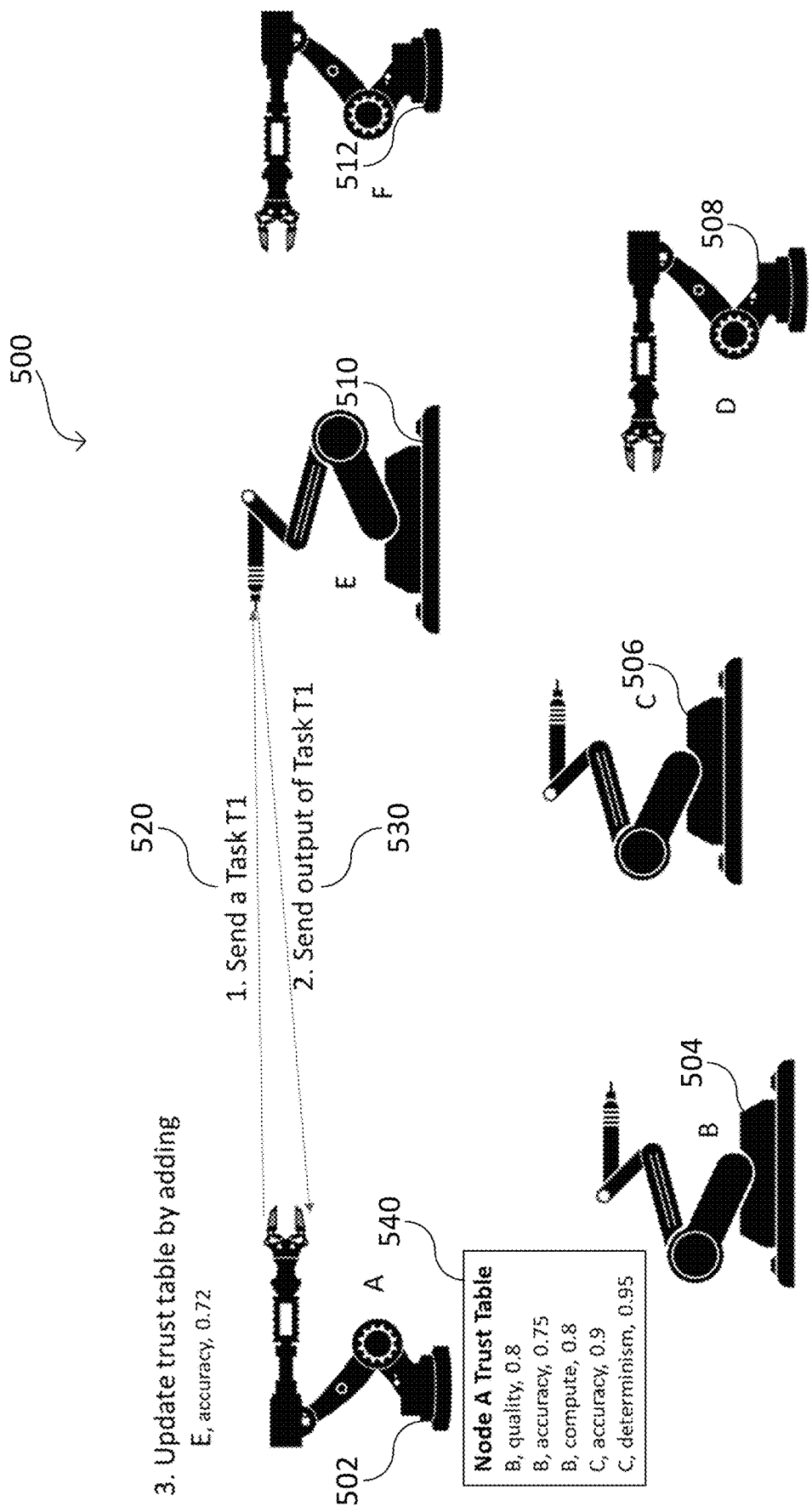
FIG. 5 shows an exemplary group of automated machines according to various aspects of the present disclosure.

FIG. 5 shows an example of an autonomous machine 100 in accordance with various aspects of the present disclosure. In some aspects, machine 100 may include one or more processors 102; one or more one or more sensors 104; one or more effectors 114; one or more kinetic chains 116 (e.g., holding an effector); one or more propulsion devices 118; and/or one or more communication devices 120.

A sensor (also referred to as detector) may be understood as a transducer that is configured to qualitatively or quantitatively sense a property of its environment (also referred to as environmental property) corresponding to the sensor type, e.g., a geometric, kinematic, mechanical, radiometric (e.g., photometric), thermodynamically, electrical and/or chemical property. The sensed quantity is the physical quantity, to which a sensing process using the sensor is directed. Depending on the complexity of the sensor's environment to be sensed, the sensor may be configured to distinguish only between two states of the sensed quantity or to distinguish between more than two states of the sensed quantity. A sensor may be part of a specific processing chain (also referred to as sensing chain), which includes a corresponding infrastructure (e.g., including processor, storage medium and/or bus system or the like). The sensing chain may be configured to operate the corresponding sensor (e.g., water sensor, pressure sensor and/or actuation sensor), to process its sensed quantity as input and to provide a target information as output, which represents the input. According to various aspects, the one or more processors 102 (e.g., being components of a controller) may be configured to implement at least a part of the sensing chain. It is noted that the sensing chain may optionally include wireless data exchange, e.g., between various nodes of a network based sensing chain. For example, the sensing chain may be configured to output the sensing result via an electrical signal (also referred to as sensor signal) or communicate the sensing result wirelessly to another component of the sensing chain or to a further communication device (e.g., of a further autonomous machine).

According to various aspects, the sensing result (also referred to as sensor data) may include sensor raw data, quantized information about the sensed property (e.g., one or more values of the sensed property), or a result of processing the information about the sensed property and/or the sensor raw data. For example, the result of an image acquisition as exemplarily sensing process, may include pixel raw data, the image data based on the raw data, the result of an object recognition based on the image data, a spectral composition, a light intensity value, a distance determined based on the image data, etc. The result of the sensing process may include various types of information about an environment of the sensor, which are based on the sensing process performed by the sensor. According to various aspects, the result of the sensing process may include information about one or more logic, geometric, kinematic, mechanical, radiometric (e.g., photometric), thermodynamically, electrical and/or chemical properties of the environment of the sensor, which are determined based on the sensing process performed by the sensor. Analogously, the type of information may be a logic type, geometric type, kinematic type, mechanical type, radiometric type (e.g., photometric type), thermodynamic type, electric type and/or chemical type.

According to various aspects, the same sensing result may be obtained by sensing various environmental properties and/or by various sensors. For example, a distance of the autonomous machine from an object may be determined based on a radar sensor, a LIDAR sensor, or also by processing image data provided by a camera, e.g., stereographic image data. For example, a temperature may be determined based on a resistive temperature sensor or based on a radiometric sensor, e.g., based on a spectral composition sensed by the radiometric sensor.

Generally, each sensor 104 may be configured to sense an actual condition (also referred to as actual state), e.g., the condition at the point of time of the sensing process. Examples of the one or more sensors 104 may be configured to sense the actual condition of the machine 100 (also referred to as operational condition), wherein other examples of the one or more sensors 104 may be configured to sense the actual condition of the environment of the machine 100 (also referred to as environmental condition), e.g., to which the one or more sensors 104 are exposed. Examples of sensing the actual condition of the machine 100 may include: sensing the temperature of the machine 100, sensing the position of an effector, sensing the position of one or more nodes of the kinetic chain 116, sensing the position and/or orientation of the machine 100, sensing the speed of the machine, sensing an operation and/or status of the effector, e.g., sensing a force that the effector may generate, sensing a fluid flow that the effector may generate, generating an electrical power output that the effector may generate. Examples of sensing the environmental condition of the machine 100 may include: sensing an object in the vicinity of the machine 100, e.g., one or more properties of the object; sensing a progress of the task performance; sensing radiation in the vicinity of the machine 100, e.g., electromagnetic radiation or particle radiation; sensing sound/acoustics. Examples of the object may include: the workpiece that machine 100 may process, a human, another machine; a fluid, a gas, a solid. Examples of the properties of the object may include: a distance of the object from the machine; a position of the object; a temperature of the object; a texture of the object; a chemical composition of the object; a movement of the object; etc.

Examples of the one or more sensors 104 include one or more optoelectronic sensors 104 (e.g., providing one or more image acquisition devices), one or more position sensors 106, one or more speed sensors, one or more distance sensors, e.g., one or more radar sensors 108 and/or one or more LIDAR sensors, one or more temperature sensors 110, one or more force sensors 112. Examples of the one or more propulsion devices 118 may include one or more ground propulsion devices 118, one or more water propulsion devices 118 and/or one or more air propulsion devices 118. Exemplary components of a propulsion device 118 may include one or more motors; one or more rollers; one or more tires; one or more continuous tracks, one or more propellers; and the like. Exemplary components of a communication device 120 may include one or more wireless transceivers 208, 210, 212; one or more antennas (also referred to as antenna system); one or more amplifiers, one or more filters, one or more modulators, one or more demodulators, one or more baseband-processors, one or more signal processors, one or more memories.

Optionally, one or more components of the autonomous machine 100 may be configured exchangeable (also referred to as exchangeable components). The autonomous machine may be configured to unmount an exchangeable component and mount a further exchangeable component in place of the unmounted component (also referred to as self-change process). For example, at least one effector of the autonomous machine 100 may be configured to as exchangeable component. In this case, the kinetic chain 116 holding the effector may be configured to release (e.g., unmount) the effector and mount another effector (also referred to as change tools).

As outlined below in more detail, the one or more processors 102 may be configured to generate one or more messages in accordance with a wireless communication protocol and provide the received one or more messages to the one or more communication devices 120. The one or more communication devices 120 may be configured to send the one or more messages in accordance with a wireless communication protocol. Analogously, the one or more communication devices 120 may be configured to send the one or more messages in accordance with a wireless communication protocol and provide the received one or more messages to the one or more processors 102. The one or more processors 102 may be configured to process the one or more messages.

Figure 2:
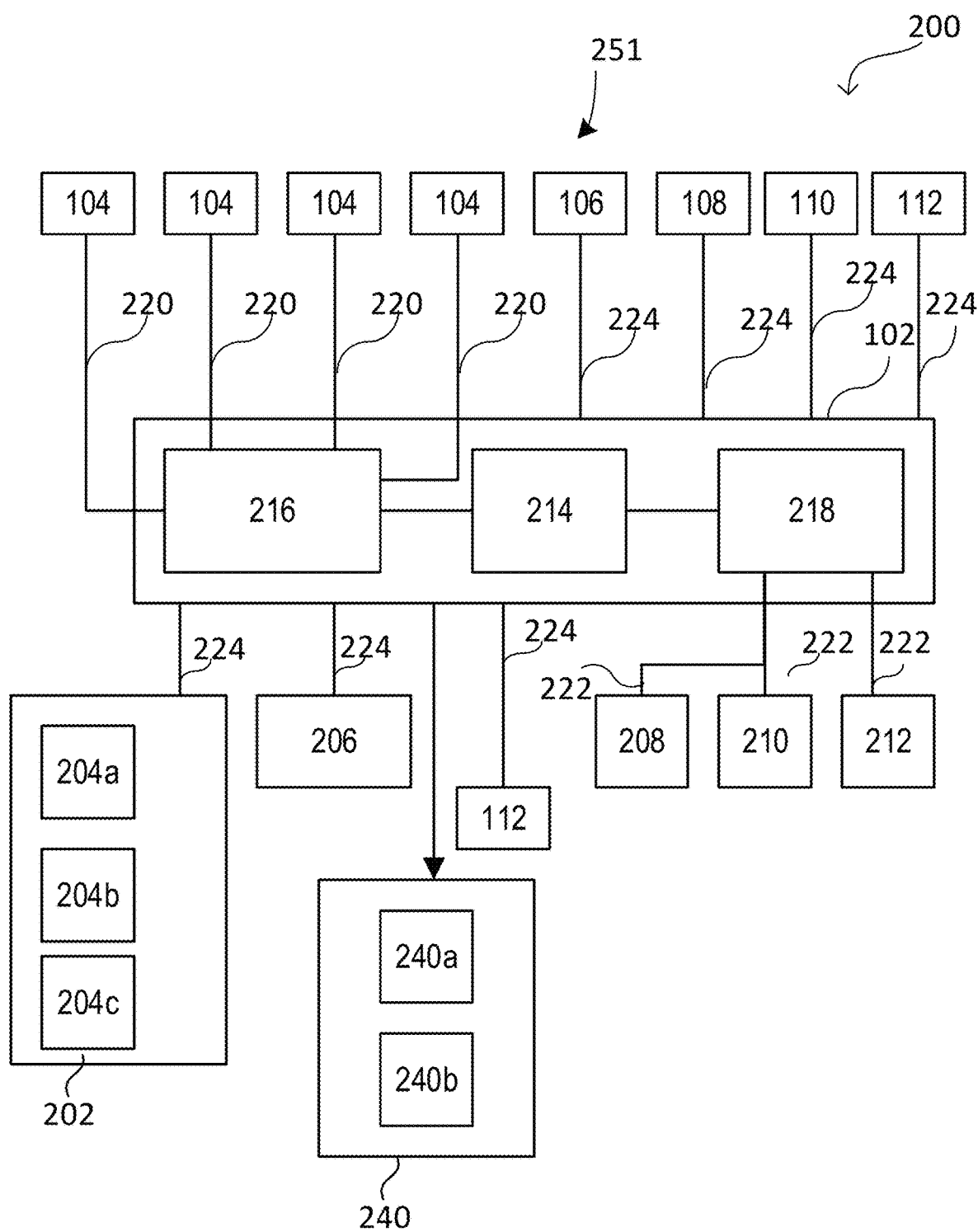
FIG. 2 shows various exemplary electronic components of a control system of the machine in accordance with various aspects of the present disclosure.

In some aspects, machine 100 may include a control system 200 (as described with respect to FIG. 2 below). It is appreciated that machine 100 and control system 200 are exemplary in nature and may thus be simplified for explanatory purposes. Locations of elements and relational distances (as discussed above, the figures are not to scale) are provided as examples and are not limited thereto. The control system 200 may include various components depending on the requirements of a particular implementation.

Figure 6:
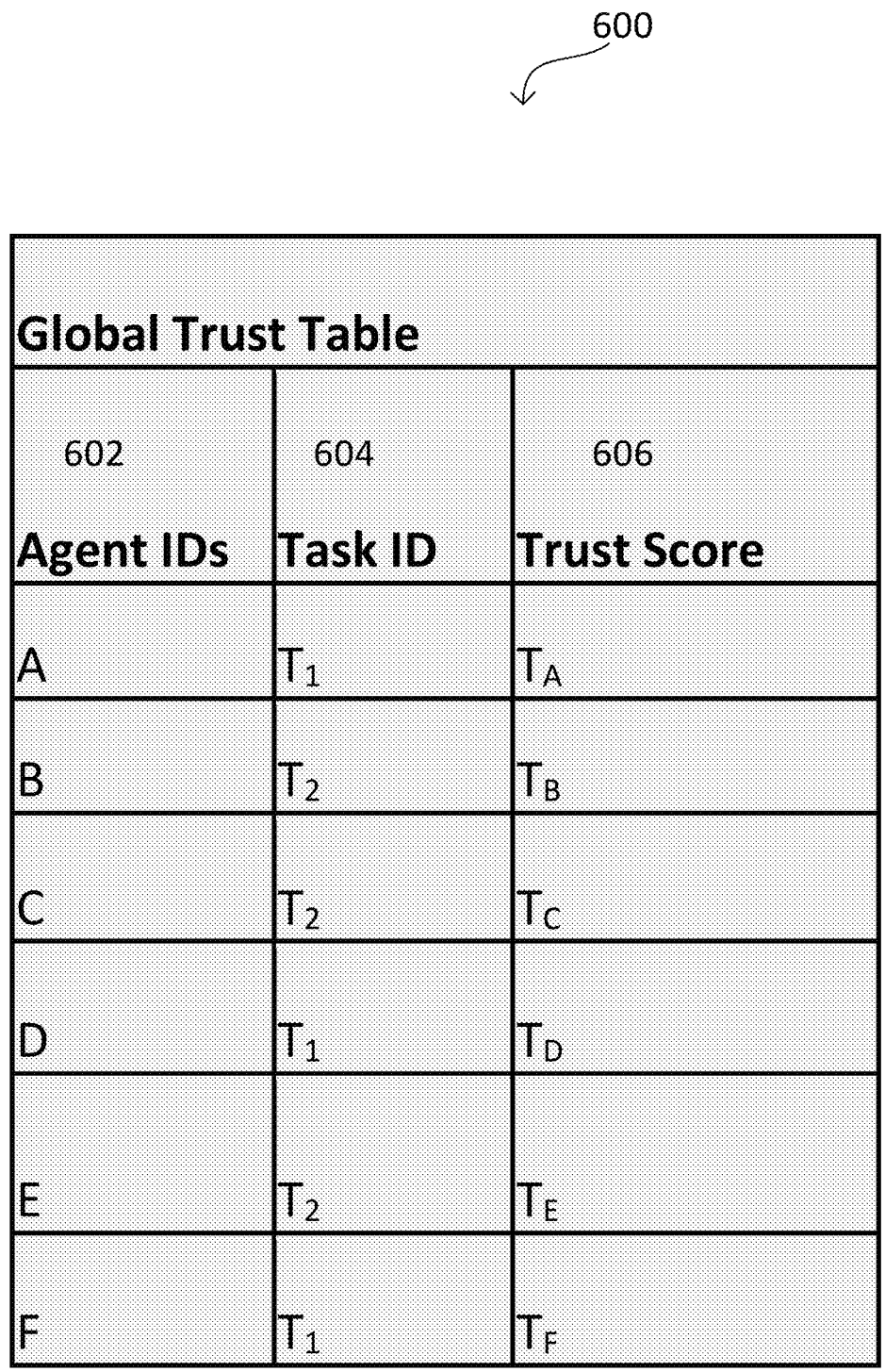
FIG. 6 shows an exemplary trust table according to various aspects of the present disclosure.

FIG. 6 shows various exemplary electronic components of a machine, namely control system 600, in accordance with various aspects of the present disclosure. In some aspects, the control system 200 may include one or more processors 102, one or more image acquisition devices 104 (e.g., one or more cameras), one or more position sensors 106 (e.g., a Global Navigation Satellite System (GNSS), a Global Positioning System (GPS), among others) one or more speed sensors 108, one or more radar sensors 110, and/or one or more LIDAR sensors 112. according to at least one aspect, control system 200 may further include one or more memories 202, one or more map databases 204*a*, one or more mission databases 204*b*, one or more models 204*c*, one or more input/output interfaces 206 (e.g., user interfaces), and/or one or more wireless transceivers 208, 210, 212. Exemplary components of the one or more input/output interfaces 206 include one or more displays, one or more touch screens, one or more microphones, one or more loudspeakers, one or more buttons and/or switches, etc.

The wireless transceivers 208, 210, 212 may, in some aspects, be configured according to the same, different, or any combination thereof radio communication protocols or standards. By way of example, a wireless transceiver (e.g., a first wireless transceiver 208) may be configured in accordance with a Short Range mobile radio communication standard (e.g., Bluetooth, Zigbee, among others). As another example, a wireless transceiver (e.g., a second wireless transceiver 210) may be configured in accordance with a Medium or Wide Range mobile radio communication standard (e.g., 3G (e.g. Universal Mobile Telecommunications System—UMTS), 4G (e.g. Long Term Evolution—LTE), and/or 5G mobile radio communication standard in accordance with corresponding 3GPP ($3^{rd}$ Generation Partnership Project) standards, among others). As a further example, a wireless transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more wireless transceivers 208, 210, 212 may be configured to transmit signals via the antenna system over an air interface.

In some aspect, the one or more processors 102 may include an application processor 214, an image processor 216, a communication processor 218, a signal processor, and/or any other suitable processing device. Image acquisition device(s) 104 may include any number of image acquisition devices and components depending on the requirements of a particular application. Image acquisition devices 104 may include one or more image capture devices, e.g., cameras, CCDs (charge coupling devices, or any other type of image sensor).

In at least one aspect, the control system 200 may also include one or more data interfaces communicatively connecting the one or more processors 102 to other components of the control system 200. For example, one or more the data interfaces may be configured to exchange data in accordance with a fieldbus communication protocol or another in-machine communication protocol. For example, the one or more data interfaces may include a first data interface, e.g., including any wired and/or wireless first link 220 or first links 220 configured to transmit image data that the one or more image acquisition devices 104 acquires to the one or more processors 102 (e.g., to the image processor 216). For example, the one or more data interfaces may include a second data interface, e.g., including any wired and/or wireless second link 222 or second links 222 configured to transmit radio transmitted data that the wireless transceivers 208, 210, 212 may acquire to the one or more processors 102, e.g., to the communication processor 218. For example, the one or more data interfaces may include a third data interface 224, e.g., including any wired and/or wireless third link 224 or third links 224, coupled to the position sensor 106 and/or the one or more force sensors 112.

Such data transmissions may also include communications (e.g., one-way or two-way) between the machine 100 and one or more other (target) machines in an environment of the machine 100 (e.g., to facilitate coordination of navigation of the machine 100 in view of or together with other (target) machines in the environment of the machine 100), or even a broadcast transmission to unspecified recipients in a vicinity of the transmitting machine 100.

One or more of the transceivers 208, 210, 212 may be configured to implement the group communication protocol (e.g., including a wireless data exchange protocol), and optionally one or more other communication protocols. In some aspects, the group communication protocol may include a proprietary wireless communication protocol or may be a proprietary wireless communication protocol. In some aspects, the group communication protocol may be an application layer protocol, e.g., defining the format, syntax, and/or semantics of the load part of a message generated in accordance with a wireless communication protocol.

Each processor 214, 216, 218 of the one or more processors 102 may include various types of hardware-based processing devices. Exemplary components of each processor 214, 216, 218 may include: a microprocessor, pre-processors (such as an image pre-processor), graphics processors, a central processing unit (CPU), support circuits, digital signal processors, integrated circuits, memory, or any other types of devices suitable for running applications and for sensor data processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when a processor (e.g., the one or more processors 102) executes, controls the operation of the system, e.g., of the control system 200. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the control system 200 may further include components such as a speed sensor 108 (e.g., a speedometer) for measuring a speed of the machine 100. The control system may also include one or more accelerometers (either single axis or multiaxis) (not shown) for measuring accelerations of the machine 100 along one or more axes. The control system 200 may further include additional sensors or different sensor types such as an ultrasonic sensor, a thermal sensor, one or more radar sensors 110, one or more LIDAR sensors 112 (which may be integrated in the head lamps of the machine 100), and the like. The third data interface may couple the speed sensor 108, the one or more radar sensors 110 and the one or more LIDAR sensors 112 to at least one of the one or more processors 102.

The one or more memories 202 may store data, e.g., in a database or in any different format. The one or more processors 102 may be configured to process sensory information (also referred to as sensor data), such as images, radar signals, depth information from LIDAR, temperature values or stereo processing of two or more images) of the environment of the machine 100 together with position information, such as a GPS coordinate, a machine's ego-motion, etc., to determine a current location of the machine 100 relative to the known landmarks, and refine the determination of the machine's location. Certain aspects of this technology may be included in a localization technology such as a mapping and routing model.

The map database 204 may include any type of database storing (digital) map data for the machine 100, e.g., for the control system 200. The map database 204 may include data relating to the position, in a reference coordinate system, of various items, including roads, buildings, walls, topographic features (e.g., stairs), geographic features, rooms, points of interest, spatial information of a task, docks, etc. In some aspects, a processor of the one or more processors 102 may download (e.g., some or all) information of the map database 204 over a wired or wireless data connection to a communication network (e.g., over a cellular network and/or the Internet, etc.). In some aspects, a processor of the one or more processors 102 may be configured to determine, e.g., form and/or update, (e.g., some or all) information of the map database 204, e.g., based on sensing the environmental condition by the one or more sensors 104. In some aspects, the map database 204 may store a sparse data model including polynomial representations of the environment of the machine 100.

In some aspects, the control system 200 may include a mission database. Exemplary components of the mission database may include mission data, a task list, a task status, a task allocation, achievement parameters, target results, etc. Illustratively, the mission database may provide and/or store information about a mission of the team, to which the machine 100 is affiliated. Some information of the mission database (e.g., some mission data) may be provided to the machine 100, e.g., one or more other members of the team and/or a central mission controlling authority may provide the information of the mission database. The machine 100 may provide some information of the mission database (e.g., some mission data), e.g., to one or more other members of the team and/or to a central mission controlling authority. The machine 100 may update and/or form some information of the mission database (e.g., some mission data), e.g., in accordance with a status of the mission and/or based on a sensing result of the machine 100.

Furthermore, the control system 200 may include a task performance model 204b, e.g., an automated system may implement the task performance model 204b. By way of example, the control system 200 may include (e.g., as part of the task performance model) a computer implementation of a formal model of the machine or its environment. By way of example, the control system 200 may include (e.g., as part of the task performance model) a safety performance model, a task interpretation model and/or a machine control model. A task performance model may be or include a mathematical model formalizing an interpretation of applicable task performance policies, safety policies, operation policies, mission data, etc., e.g., being applicable to autonomous machines. It is noted that one or more of the detailed components of the task performance model may be implemented monolithically of the separately from each other, e.g., by separate applications that the one or more processors may execute.

For example, the safety performance model may be configured to achieve, e.g., three goals: first, the interpretation of safety policies should be sound in the sense that it complies with how humans interpret the safety policies; second, the interpretation should lead to a useful task performance, meaning it will lead to an agile task performance rather than an overly-defensive task performance which inevitably would confuse other agents (e.g., humans and/or machines) and will obstruct accomplishing the mission and in turn limit the scalability of system deployment; and third, the interpretation should be efficiently verifiable in the sense that it can be rigorously proven that the autonomous machine correctly implements the interpretation of the safety policies. The safety performance model, illustratively, may be or include a mathematical model for safety assurance that enables identification and performance of proper responses to dangerous situations such that self-perpetrated accidents can be avoided.

For example, the task interpretation model may be configured to determine a formal formulation of performance steps the machine may perform, e.g., based on information about one or more tasks of the mission allocated to the machine and/or based on the target performance. The conversion may be configured to lead to an efficient task performance and to a result, which meets the target performance as best as possible, e.g., to accomplish the task.

For example, the machine control model may be configured to determine useful actions that the machine may take leading to a useful task performance, e.g., based on the performance steps and/or the model of the machine and/or its environment. For example, the machine control model may generate the control instructions based on a model of the kinetic chain of the machine, the available effectors of the machine, the reachable position of the machine, etc.

The control system 200 may generate data to control or assist to control the engine control unit (ECU) and/or other components of the machine 100 to directly or indirectly control the driving of the machine 100.

In some aspects, the control system 200 may include a driving device 240 configured to drive one or more actuators of the autonomous machine, e.g., one or more actuators of the kinematic chain of the autonomous machine 100 and/or one or more actuators of the one or more propulsion devices 118. For example, the driving device 240 may include one or more amplifiers 240*a* and/or one or more energy storages 240*b*. Examples of energy storages 240*b* may include any storage capable to storing energy (in a certain form, e.g., such as electrically, magnetically, chemically, and the like) and convert the stored energy in electrical power. Examples of the amplifiers 240*a* may include any voltage-to-voltage converter providing an operation voltage of the one or more actuators based on the electrical supply power and based on a control signal received from the one or more processors 102.

As described above, the machine 100 may include the control system 200 as also described with reference to FIG. 2.

The machine 100 may include the one or more processors 102 e.g. integrated with or separate from an engine control unit (ECU) of the machine 100.

The control system 200 may in general generate data to control or assist to control the ECU and/or other components of the machine 100 to directly or indirectly control the driving of the machine 100.

Although the following aspects will be described in association with the above detailed models, any other model may be provided in alternative implementations.

Figure 3:
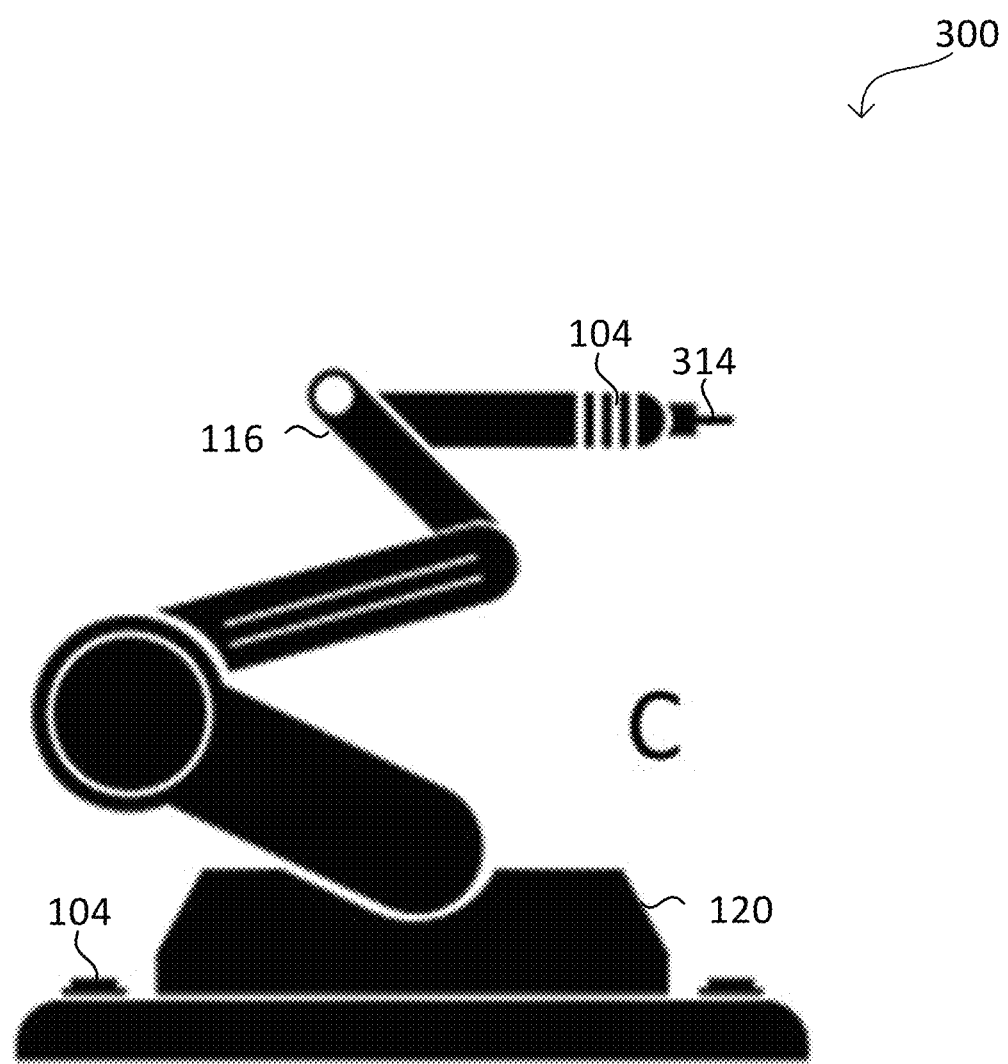
FIG. 3 shows an example of a machine in accordance with various aspects of the present disclosure.
Figure 4:
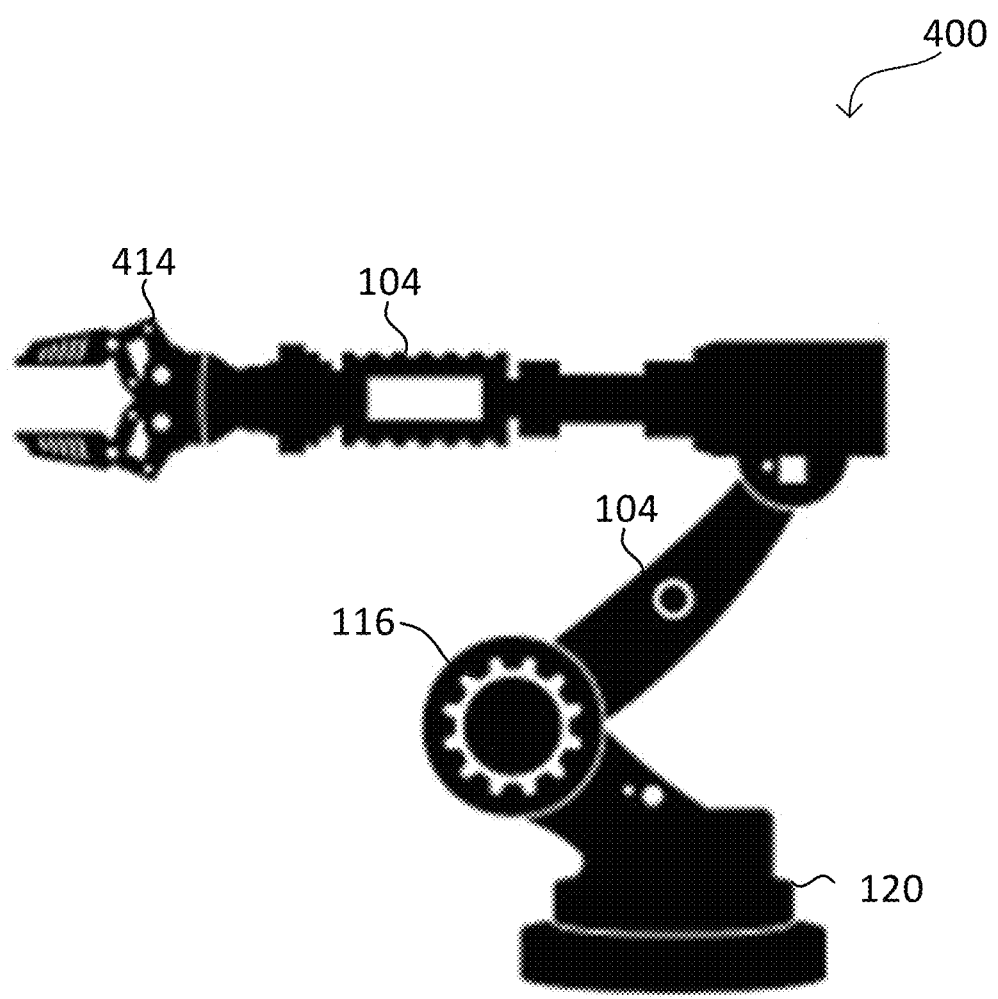
FIG. 4 shows an example of a machine in accordance with various aspects of the present disclosure.
Figure 7:
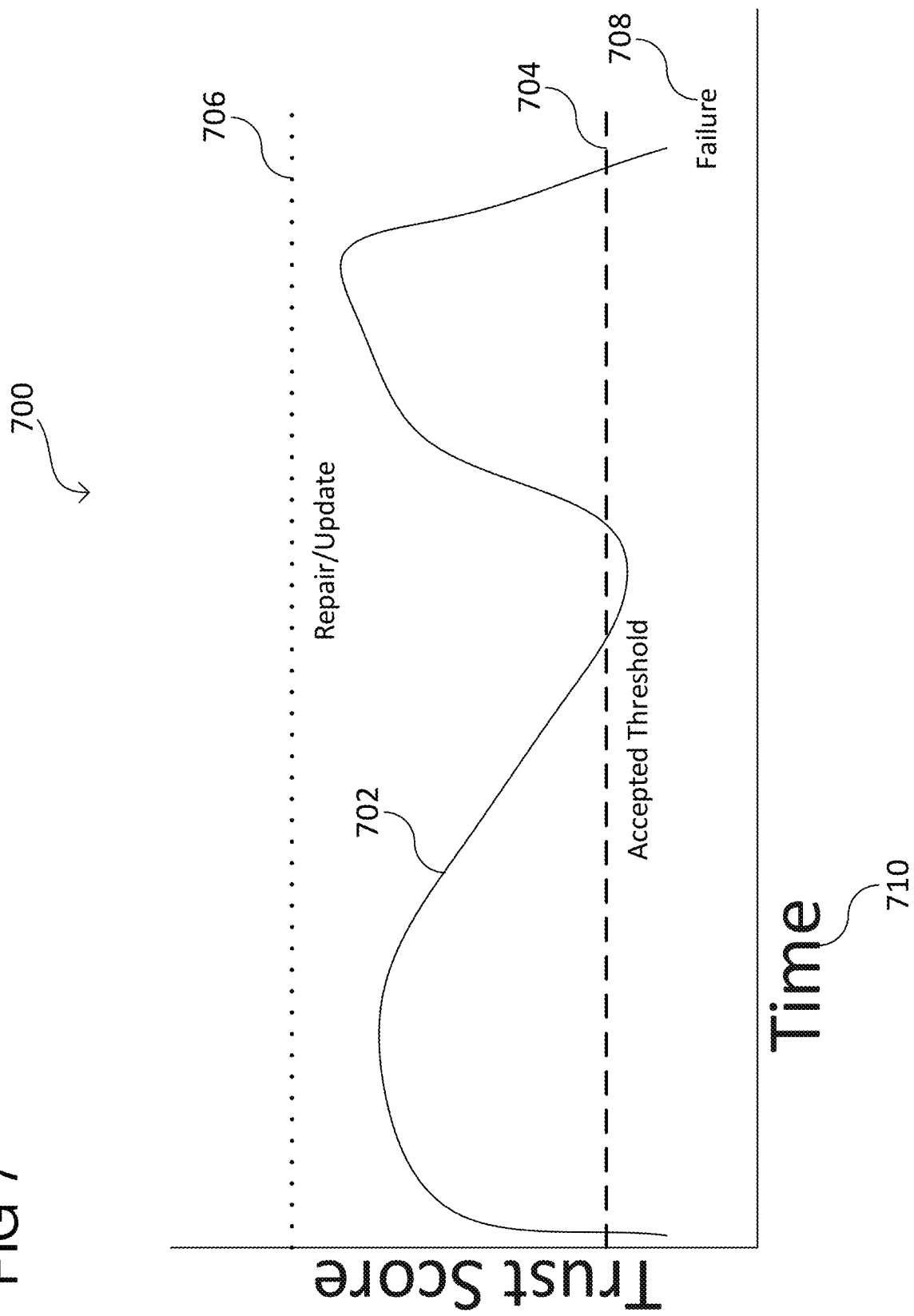
FIG. 7 shows an exemplary chart of comparing an accuracy score to an accuracy threshold according to some aspects of the present disclosure.

FIGS. 7 and 4 show further examples of autonomous machines. FIG. 3 shows a further example of an autonomous machine 300 in accordance with various aspects of the present disclosure. Autonomous machine 300 may be similar to autonomous machine 100 of FIG. 1 and include similar components. For example, one or more processors 102 (not shown); one or more one or more sensors 104; one or more effectors 114; one or more kinetic chains 116 (e.g., holding an effector); and/or one or more communication devices 120. Machine 300 may be stationary and include a welding device 314 similar to effector 114 of FIG. 1.

Figure 8:
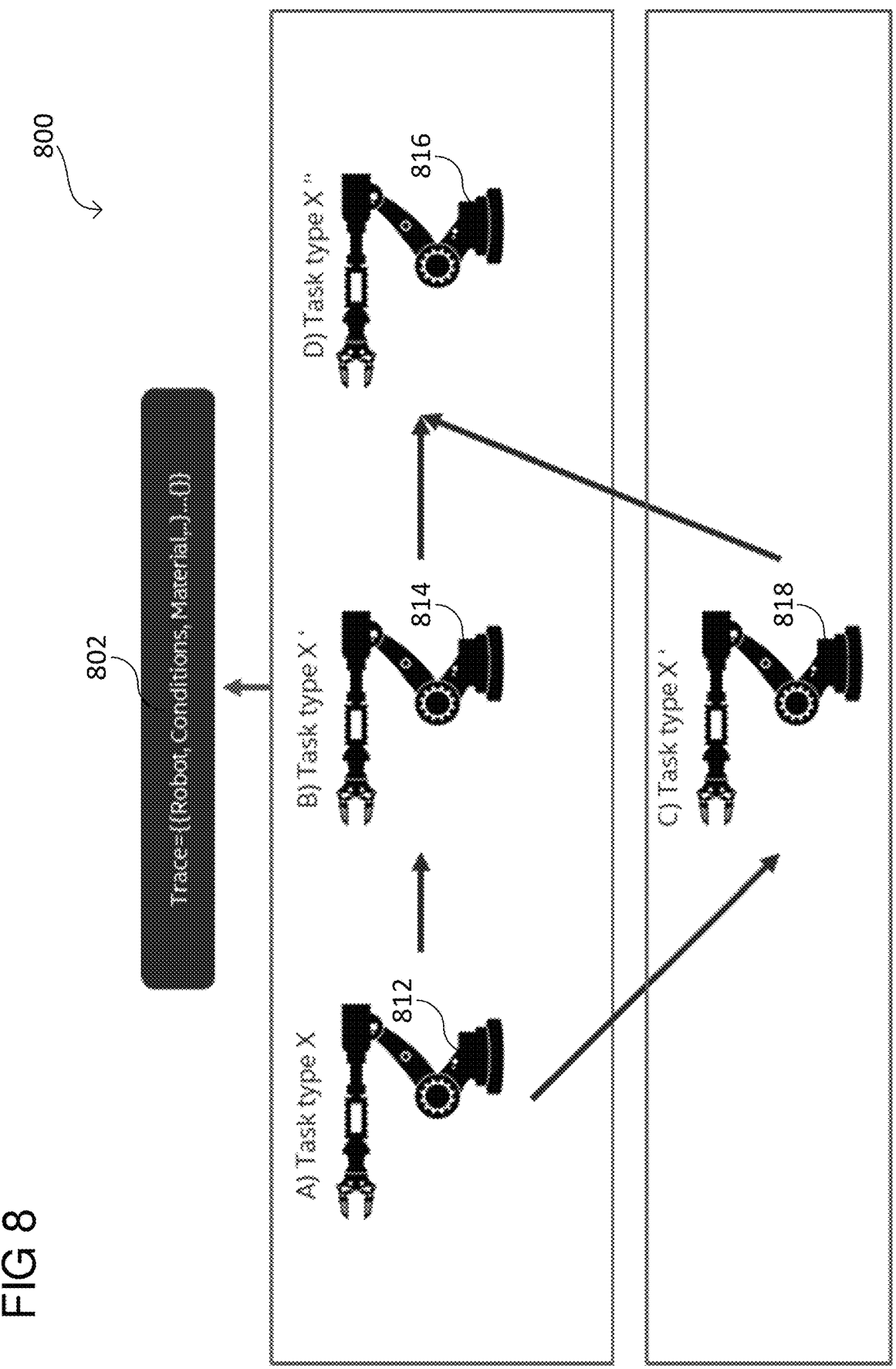
FIG. 8 shows an exemplary group of automated machines according to various aspects of the present disclosure.

FIG. 8 shows a further example of an autonomous machine 400 in accordance with various aspects of the present disclosure. Autonomous machine 400 may be similar to autonomous machine 100 of FIG. 1 and include similar components. For example, one or more processors 102 (not shown); one or more one or more sensors 104; one or more effectors 114; one or more kinetic chains 116 (e.g., holding an effector); and/or one or more communication devices 120. Machine 400 may be stationary and include a grabber device 414 similar to effector 114 of FIG. 1.

Herein, reference is made to various methods', processing chains, operations, computations, logical relations, models and functions, e.g., with respect to autonomous machines. It can be understood that the references made may be analogously apply to a controller and/or code segments implementing the methods, processing chains, operations, computations, logical relations, models and functions.

Aspects detailed herein provide for a robust collaborative sensing and self-assessment for autonomous machines that improves the determination and/or handling of sensory failures, reduces the effort for the determination and/or handling of sensory failures, and reduces the down time of autonomous machines due to sensory failures.

FIG. 5 shows a group of autonomous machines 500 working together. For example, the group of autonomous machines 500 may be assigned to the same mission or task. Each autonomous machine 502, 504, 506, 508, 510, and 512 may be configured to communicate with each other. Each autonomous machine may compare store data associated with its completed actions and compare the completed actions with an expected action. Data associated with expected actions may be stored locally on each autonomous machine, or in a centralized location accessible to all machines in the group.

Each autonomous machine also stores the trust measurement of each other autonomous machine in the group. For example, autonomous machine 502 may send a request for information to autonomous machine 510 regarding task 520. Alternatively, autonomous machine 502 may assign task 520 to machine 510. Autonomous machine 510 may replay to machine 502 with information 530 regarding its actions taken to complete task 520. Information 530 may include information regarding the action taken or a determined trust score associated with task 520. If the information 530 does not include a trust score, autonomous machine 502 may determine a trust score from information 530 regarding task 520 and autonomous machine 510. Each autonomous machine may store trust scores in a trust table. For example, trust table 540 of autonomous machine 502. The trust table 540 may include multiple trust scores for each autonomous machine 502, 504, 506, 508, 510, and 512. For example, the trust table may include a trust different tasks completed, sensor measurements, battery life, etc. by another autonomous machine. Based on the trust scores, an autonomous machine may determine if it can trust another autonomous machine.

The system of autonomous machines 500 may be configured to monitor the observed behavior of other autonomous machines in the compare them with an expected behavior. The expected behavior may be predetermined based on rules and stored in a central location, or each autonomous machine may determine the expected behavior based on environment conditions, task, and/or sensor measurements. The trust score may be based on a comparison between expected behavior and observed behavior.

The trust score may be stored locally on each autonomous machine and used for future tasks including transfer learning and model (algorithm) sharing.

Trust on certain type of robots may depend on history. For example, the trust score associated with a type of task may be tracked over time to determine if an autonomous machine is improving or not. Tracking the historical accuracy of an autonomous machine may help identify if there is a chain of dependencies that may end up with a robot being more or less effective.

Similarly, contextual factors, such as environment conditions may create conditional level of trust. For example, some autonomous machines may not operate well in the dark. If this is identified, other autonomous machines know not to trust the machine that is determined not wo operate well given that condition.

As previously mentioned, expected behaviors may be stored in a central location such as an edge or cloud server. This may be identified as a centralized trust broker which is consulted to evaluate compliance to whitelist policies and to recover systems that may be infected with rogue code. The whitelist policies may be distributed to the autonomous machines of the group so that they may coordinate amongst themselves. Alternatively, the whitelist policies may be stored locally on each of the automated machines. The whitelist policies enable localized secure operational trust states for knowledge sharing.

If the observed action or behavior is determined to deviate too far from the observed action or behavior, this may be identified as a defect then it is a negative outcome that reduces the autonomous machines's trust score.

This enables a self-organizing usage of the measured behavior of other autonomous machines. Using context, such as environment conditions, allows for nuance trust scores based on the skill and performance of autonomous machines. This also helps identify autonomous machines that potentially need maintenance and are under-performing as they won't receive as many tasks. The trust score may be expanded to depend on a wide range of requirements and different tasks that need to be accomplished.

Each autonomous machine and/or the centralized trust broker may store the trust table as a public ledger. The public ledger approach would provide the capability to track all the transactions around trust metric towards reputation score, provenance, record keeping, searching, and for auditability.

The public ledger may be implemented as a blockchain. A blockchain or public ledger is a distributed database that maintains a growing list of data records that are hardened against tampering and revision. A blockchain includes "blocks," which hold data or both data and programs. Each block holds batches of individual "transactions" between blockchain participants. Each block includes a timestamp and linking information, such as a hash value, linking the current block to the previous block; the linking information allows traversal of the blockchain for all blockchain participants.

Blockchain transactions are integrity protected using a distributed hashing algorithm that requires each transaction processor to agree to the next block in the blockchain. Integrity is achieved through a consensus of multiple participants, each participant having access to its own copy of the ledger. If a majority of the participants agree on the contents of the ledger, then those agreed upon contents become the "truth" for the ledger; the participants that disagree will accept the truth of the majority (otherwise, they would not be able to function). Integrity is provable because an attacker would have to compromise a majority of participants and modify their copies of the ledger; this is extremely difficult (if not impossible).

FIG. 6 shows an exemplary global trust table 600 for all the autonomous machines in a group. Global trust table 600 may be a public ledger as previously described. Each autonomous machine, or blockchain participant, may store a version of the global trust table 600. The global trust table 600 may include a column 602 to identify the autonomous machine, a column 604 to identify the task, and a column 606 to identify the trust score. The global trust table 600 may include other columns representing other factors in determining the trust score. For example, observed behavior, expected behavior, and/or environment conditions.

If the global trust table is maintained by each autonomous machine, this may introduce unnecessary overhead for the robot. The global trust table may also be maintained in a central location, such as an edge server which can be exchanged, and when new robots/machines join a group or when a new task is about to begin, they are added to the trust table. It will also have the advantage that only trusted machines will be assigned to the new task. This will also reduce the computation/communication overhead and increase the efficiency of each autonomous machine. Similar to the concept of exchanging best-known-methods (BKMs) humans use to reduce the time/complexity and increase efficiency/making it easy for others exploring the same task. Further, the trust score can be used to decide whether autonomous operation of the robot is feasible/safe or any supervision is needed until the score improves.

FIG. 7 shows a graph 700 representing the trust score 702 of an autonomous machine over time 710. Thresholds 704 and 706 may be predefined to determine that status of the autonomous machine. Minimum threshold 704 may indicate the minimum trust score for which an autonomous machine may still be given tasks. If the trust score falls below minimum threshold 704 it may indicate a failure 708. If the trust score is indicates a failure, the autonomous machine may no longer be allocated tasks or may be removed from the group. If the trust score is between minimum threshold 704 and a higher threshold 706, this may identify that the autonomous machine requires a repair or an update. If the trust score is above threshold 706, the autonomous machine may be identified as a "trustworthy" machine. Task allocation may be done based on an autonomous machine's trust score and the autonomous machines with trust scores above threshold 706 will be assigned the majority of the tasks.

A trust score may be defined as compound score for robot reliability. The following formula may represent the compound score:

$$T = Ta + Td + Tc$$

Where T represents a compound trust score. Ta may represent accuracy and may be a compound calculation comparing predictions with runtime data. For example, Ta may be a compound of calculation of Tas, a static "predictions" (e.g. trained model accuracy) result, and Tar, a runtime results (execution accuracy) that's accumulated over the period of execution.

Td may represent the level of determinism. In other words, if the Tas and Tar don't deviate between different runs, that means we can update the expected value with high confidence vs. if they do, this could create high variability.

Tc may represent a compute load and how much we trust that the compute will deliver a certain task on time.

Additional parameters may be used to calculate a trust score and other factors may be taken into account for allocating tasks. For example, using an accepted trust threshold that defines the lowest acceptable trust score for execution of tasks.

Deviation from the projected model accuracy can demonstrate the accuracy of an executed task. Over a period time each autonomous machine can improve or deteriorate its trust score. Improvement can be achieved via deployment of the updated models and deterioration can be result of the autonomous machine components failing due to wear and tear.

The compound approach to calculating the trust score enables a well-rounded score that can be used in a trust discovery protocol to identify an autonomous machine that is trustworthy of completing a given task. A trust discovery protocol for a given group of autonomous machines may include a discovery stage. During this stage each autonomous machine of the group may broadcast their scores and other autonomous machines may discover which autonomous machines in its group are trustworthy. Each autonomous machine may then construct and maintain its own trust table or access centralized trust table.

Trust scores may be periodically updated. The frequency at which trust scores are updated may be configurable or postponed based on bandwidth. Communication of trust may be done in a different band than communications directed toward executing a task. For example, it may be preferable to use an out of band method to exchange and maintain the trust table.

Based on the trust score, an autonomous machine may allocate a task to itself or choose another autonomous machine to help with an allocated task. The discovery of other autonomous machines that may take a task or help with a task may improve the accuracy at which tasks are completed and the time in which it takes to complete them.

FIG. 8 shows an exemplary group of autonomous machines executing a task that may have multiple dependencies. A group of autonomous machines 800 may be assigned to a task 802 which may require multiple dependencies. The task may start with autonomous machine 812 and may have to end with autonomous machine 816. However, both autonomous machines 814 and 818 may execute an intermediary step. If autonomous machines 814 and 818 have substantially similar trust scores, other factors may be used to determine which machine is allocated the intermediary step. If autonomous machine 814 is located at a closer proximity to autonomous machines 812 and 816 than 818, it may save time to allocate the intermediary step to machine 814.

Other dependencies other than time may be used to allocate tasks between autonomous machines of a group. Different cause effect relationships may be used to determine task allocation. For example, Task X may include processing a material with the following flow: Task X precedes Task X' which precedes Task X". Similar to the example of FIG. 8 Task X may be performed by robot A. Task X' may be performed by robots B and C and then Task X" is performed by task D.

Robots B and C may be located in different locations with different environment conditions such as temperature or humidity which may have some effect material processing. Even though robot B may be closer and have a shorter path for processing material, if it is in an environment that may have a negative effect on processing, the group of autonomous machines may determine that it is better to have robot C execute Task X'.

Figure 9:
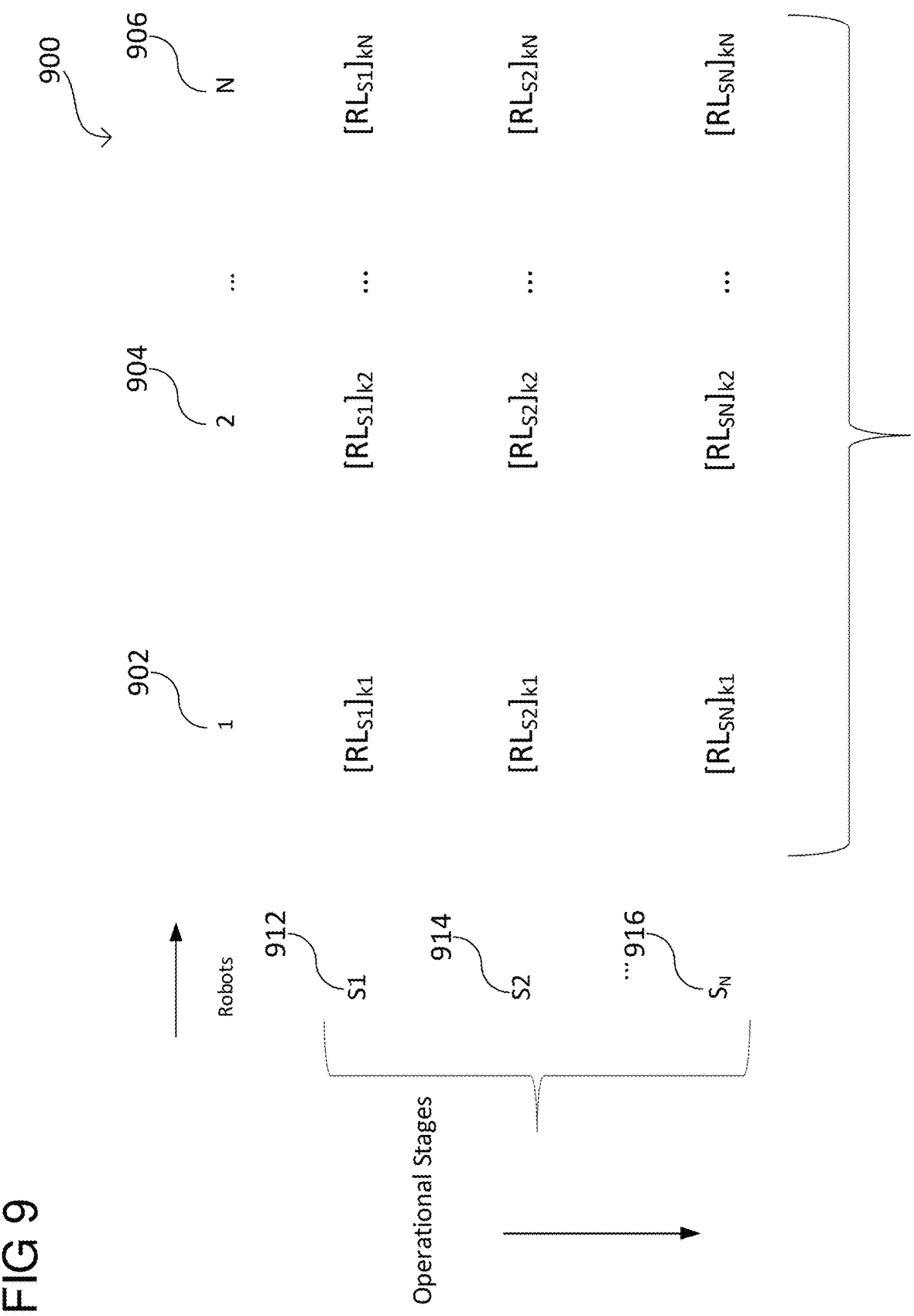
FIG. 9 shows an exemplary trust table accumulated over time according to various aspects of the present disclosure.
Figure 10:
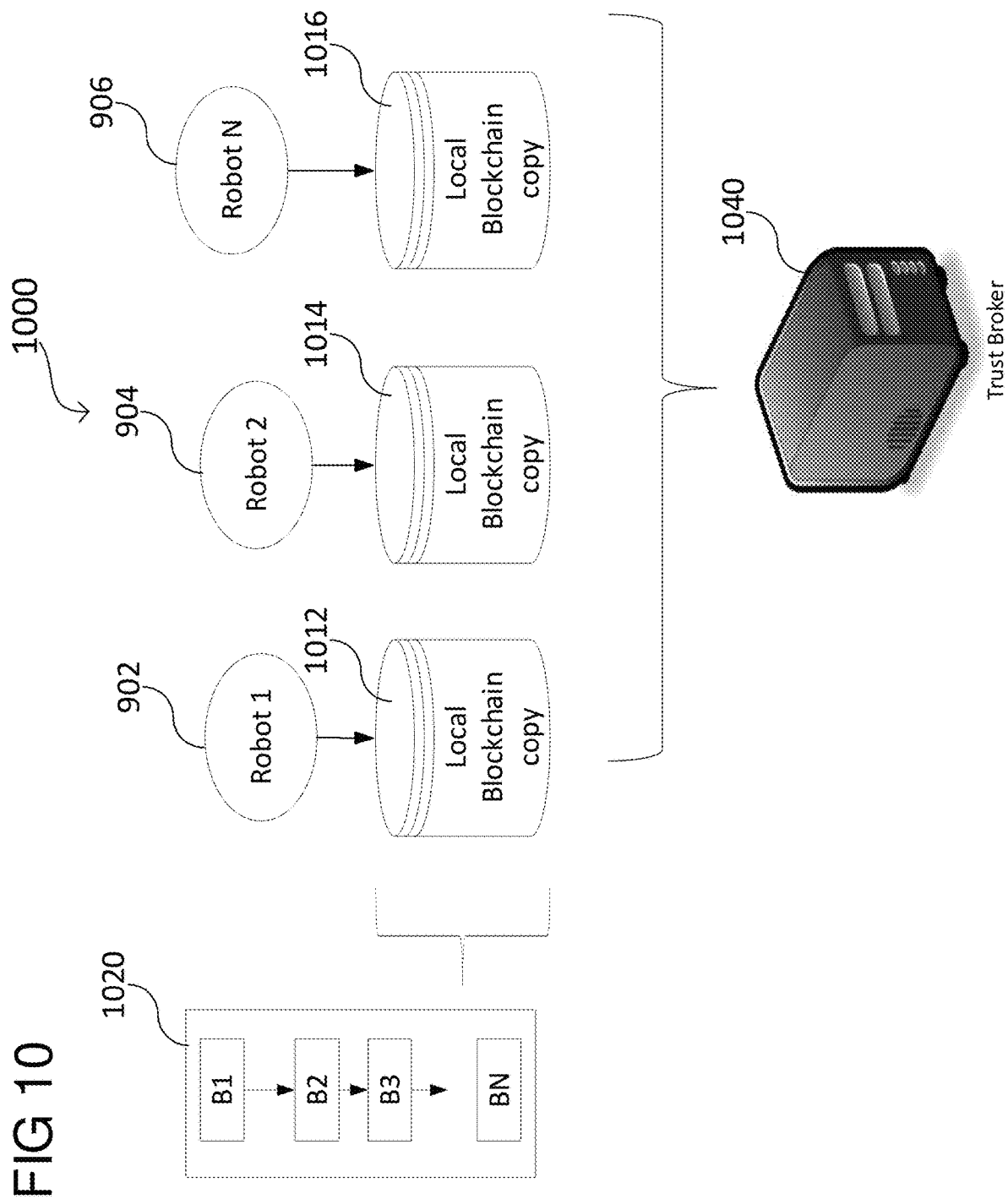
FIG. 10 shows an exemplary block chain implementation according to various aspects of the present disclosure.

FIGS. 9 and 10 show an exemplary blockchain implementation according to some aspects. FIG. 9 shows a group of autonomous machines 900 including machines 902, 904, and 906. The group may be assigned to a mission including operational stages 912, 914, and 916. The machines may use reinforced learning to assign a score for each autonomous machine at a given operational stage of the mission. As shown in FIG. 9 each combination of machine and operational stage may be associated with a trust score. In this way, it can be identified if a machine's trust score is deteriorating or improving over time.

FIG. 10 shows different blocks of the blockchain 1000. Each robot 902, 904, and 906 of FIG. 9 may be a block in blockchain 1000. Each robot 902, 904, and 906 may maintain a local blockchain copy 1012, 1014, and 1016 respectively. Blockchain 1000 may also be represented by blockchain 1020 where each block represents an autonomous machine assigned to a mission. Each block may also be represented as $$\Sigma_{i=0}^{n}[RLsx]Ki \text{ or } [RLsx]Ki$$

Where x represents an operational stage and i represents an autonomous robot.

Autonomous machines may message each other using known methods that may include publish-subscribe, multi-cast, broadcast, mesh routing and multi-unicast. Messages are protected according to standard blockchain techniques. Whitelist provisioning is expected to be initially achieved as part of software configuration/installation and update mechanisms. Subsequent whitelist provisioning may be achieved using dynamic signing keys and existing distributed computing messaging capabilities.

As shown with respect to FIGS. 9 and 10, blockchain synchronization techniques enable the autonomous machines to act as blockchain "miners" where the measurements from the local platform forms a transaction such as those shown in the table of FIG. 9. Each autonomous machine may create a similar transaction and store it locally. Each miner verifies the received transaction using a local whitelist or measurement of itself. This is the proof-of-work method. Consensus threshold is established when 100% of miners agree that every transaction is valid. An autonomous machine may only allow the next task module to be loaded after agreement amongst the group.

Figure 11:
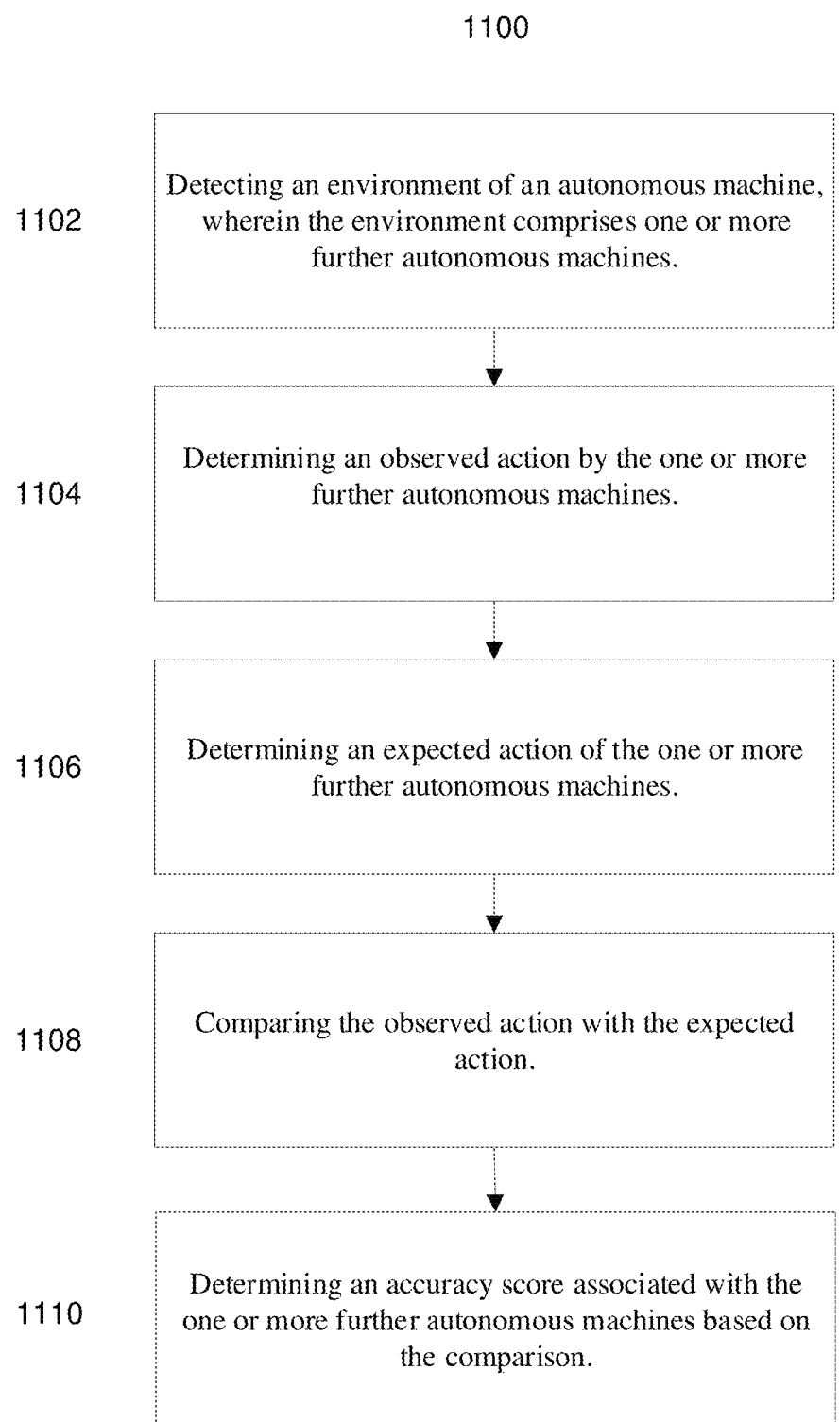
FIG. 11 shows an exemplary method in accordance with various aspects of the present disclosure in a schematic diagram.

FIG. 11 shows an exemplary method of performing a task allocation according to some aspects. FIG. 11 shows exemplary method 1100. As shown in FIG. 11, method 1100 includes detecting an environment of an autonomous machine, wherein the environment comprises one or more further autonomous machines (stage 1102); determining an observed action by the one or more further autonomous machines (stage 1104); determining an expected action of the one or more further autonomous machines (stage 1106); comparing the observed action with the expected action (stage 1108); determining an accuracy score associated with the one or more further autonomous machines based on the comparison (stage 1110).

Figure 12:
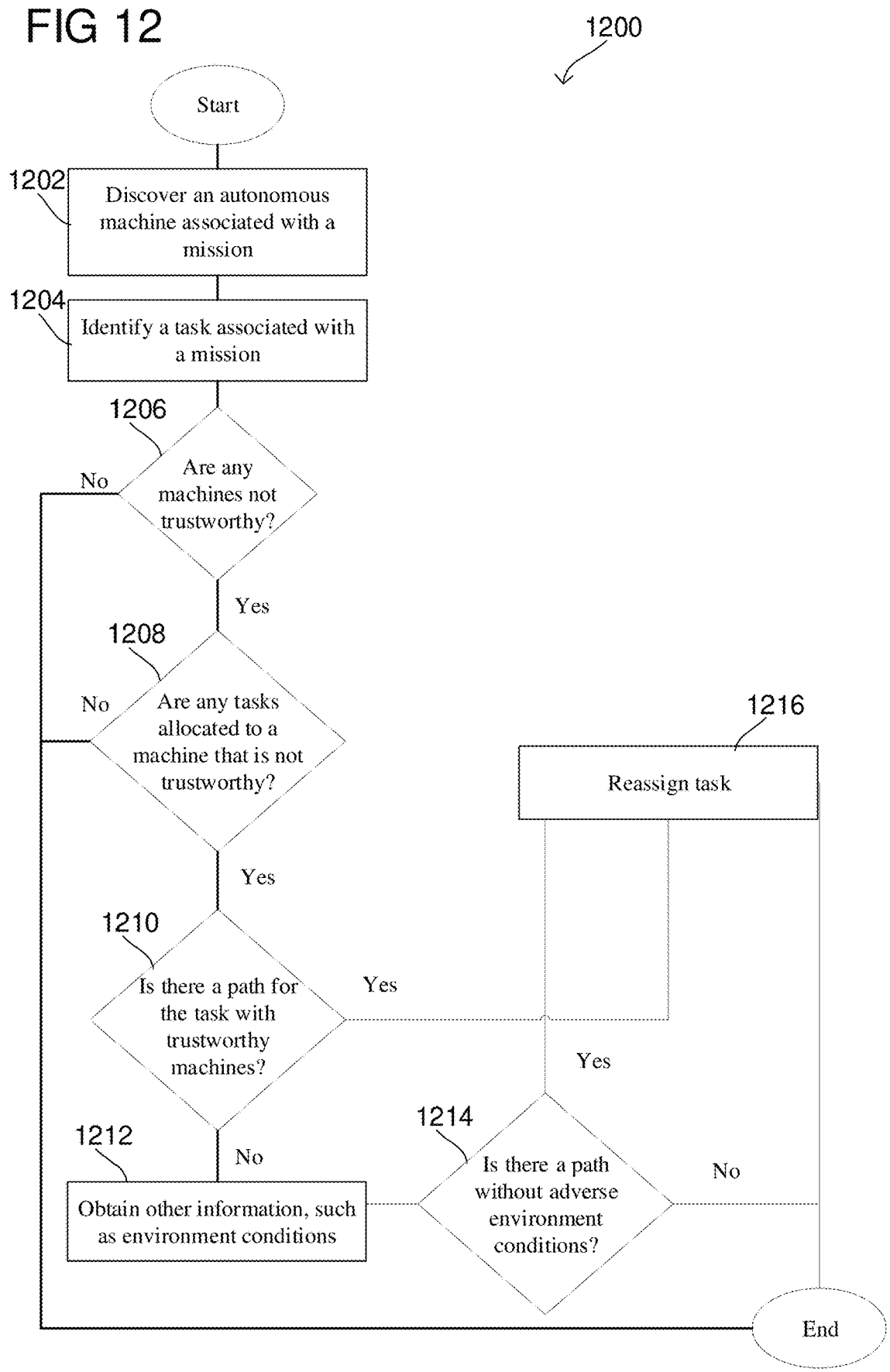
FIG. 12 shows an exemplary flow chart of assigning tasks within a group of automated machines according to various aspects of the present disclosure.

FIG. 12 an exemplary method of performing a task allocation according to some aspects. Any one of the autonomous machines in a group may monitor the group and task to ensure the mission is executed with fewer errors. At a first stage 1202 an autonomous machine may determine what other autonomous machines are assigned to the same mission. This stage may include a trust score of the other autonomous machines. At a next stage 1204 the autonomous machine may determine which tasks are associated with the mission. This information may be provided by other autonomous machines or a server. At stage 1206, the autonomous machine may determine if any of the autonomous machines in the group has a trust score that falls below the threshold. Alternatively an autonomous machine may be marked as potentially trending to low level of trust on a particular task path. At stage 1208, the group may start tracing the various flows that end up with the low performing machine performing a given task. The tracing gets correlated with the events that may be related to failures or to outliers that may indicate failures or miss-behavior. If all the flows end up with same likelihood of miss-behavior or anomaly that means that very likely there is no dependency on the previous steps. If there are some specific flows that end up with the higher likelihood of miss-behavior or anomaly then. The method may provide feedback to the system that there is a flow that has higher likelihood of causing a failure afterwards. At stage 1210 the method may determine if there are paths to completed the task without the low performing machine. If so, the method may reassign the task to a different machine at stage 1216. The robot that identifies that anomaly may require to the robots participating in the identifies flows to include or provide other detailed contextual information, such as environment conditions at stage 1212 to identify if the failure or anomaly is related to the contextual information. If the method identifies specific environment conditions or other contextual conditions cause the low trust score, it may reach out to the entities performing the routing to consider contextual information to decide task paths, and if needed reroute the task to another path at stage 1216.

In an autonomous distributed system, each autonomous machine may store data related its actions taken to execute a task and the rate at which it succeeds based on a deviation from an expectation versus the real outcome. For example, if an action resulted in a defect then it is a negative outcome. Each machine also is inspecting other nodes autonomous machines within its mission group it interacts with. This inspection can be triggered in both directions. For example, a machine can ask for an inspections or a machine could ask to inspect. even the neighboring machines could ask for this inspection. After the inspection, the participating machines will have updated trust scores for each other.

The trust score is then used to determine collaboration groups. In certain cases, a machine determines which other machines it may rely on and will use this information to choose with which machines it will collaborate. For example, perform a physical task or share sensor measurement information. In other cases, a machine will communication with other machines with a low trust score to diversify the information it receives. This may protect against attacked machines because an attacker could potentially have multiple machines that will downgrade a good node so that everyone only listens to the attacker nodes. Once that is achieved they can go rogue. If nodes continue to look at low trust nodes for feedback, they are adding diversity which will protect them from such attack.

This trust score may also be used in cases of reinforcement learning. There are many examples when autonomous machines are learning by observing and executing certain tasks. For example, Autonomous machines in a factory setting typically follow a sequential set of tasks and events in order to complete a task, e.g. manufacturing a product. In this scenario a group autonomous machines may have previously interacted and created a set of trust scores among each other. The trust score can carry additional metadata or context such as accuracy vs. latency (determinism) to improve further task execution.

When a task is required a request may be broadcast to the group of autonomous machines. Each autonomous machine may divide the task into sub-tasks to meet delivery requirements such as physical constraints. For example, assembling a product from multiple components. The capabilities of each autonomous machine are also considered along with the trust score, and time requirements. For example Task T1 may be divided as follows:

$$T1=[t_{11}, t_{12}, \ldots, t_{1N}]$$

Where T1 is the task at hand, which is divided into N subtasks.

Each autonomous machine may run its own optimization for delivering the task meeting or exceeding the requirements. It may also broadcast this optimization. During this stage, it will compute the cost of allocating different sub-tasks to different autonomous machines. For example, for each sub-task t, if assigned to a robot A, will take a certain amount of time and have an associated trust score. This trust score is added to a decision vector. A robot will use that decision vector to generate how desirable the set of robots it has selected for the task is.

The decision vector may include an expected value for each of the requirements in the initial request and a trust vector with average, and standard deviation.

Each autonomous machine who received this request will return this computation to the requesting system as proposals for the work. The requesting system could be another robot or a higher-level function monitoring the factory at a larger scale, such as the centralized trust broker previously described. The system will then select the winning proposal and send it back to the each of the autonomous machines The winning proposal will then be set in motion.

Autonomous machines who are not allocated to any sub task for a given period of time (e.g. few hours) may indicate a possible issue. However, it is possible that these machines were assigned undesirable sub-tasks, but were ultimately not chosen because of the low trust score. In this case, the set of robots operating might choose to assign a lower-risk sub-task to the lower performing machine, as determined by the group or a lead of the group. This would enable the rest of the autonomous machines delivering on a task to update their trust levels.

Autonomous machines will also age their trust levels over time if they are no longer observing a certain robot. Ageing could be deleting the trust level or simply downgrading it using a logarithmic multiplier which will degrade it slowly.

The trust score of an autonomous machine may also be used to determine high performing machines. Higher performing machines may transfer learnings from one group of collaborative autonomous systems to another group in factories. This may be the case when different groups of autonomous machines need to accomplish similar tasks at different times (and different geos/environments). The trust score from groups can be used as one of the key parameters for forming groups or even including/exchanging some members across—towards efficient collaboration and mission accomplishment.

In the following, various aspects of the present disclosure will be illustrated:

In Example 1, a controller including one or more processors configured to detect an environment of an automated machine, wherein the environment comprises a further automated machine; determine an observed action of the further automated machine; determine an expected action of the further automated machine; compares the observed action with the expected action; and determine an accuracy score associated with the further automated machine based on the comparison.

In Example 2, the subject matter of Example 1, may optionally further include wherein the processor is further configured to allocate a task based on the accuracy score.

In Example 3, the subject matter of any one of Examples 1 or 2, may optionally further include wherein the automated machine is the further automated machine.

In Example 4, the subject matter of any one of Examples 1 to 3, may optionally further include wherein the task is allocated to the automated machine.

In Example 5, the subject matter of any one of Examples 1 to 4, may optionally further include wherein the task is allocated to the further automated machine.

In Example 6, the subject matter of any one of Examples 1 to 5, may optionally further include wherein the processor is further configured to obtain sensor measurements of the further automated machine.

In Example 7, the subject matter of any one of Examples 1 to 6, may optionally further include wherein the expected action is based in part on an environment condition.

In Example 8, the subject matter of any one of Examples 1 to 7, may optionally further include wherein the expected action is based in part on the sensor measurements of the further automated machine.

In Example 9, the subject matter of any one of Examples 1 to 8, may optionally further include wherein the accuracy score comprises information that a sensor of the further automated machine has failed.

In Example 10, the subject matter of any one of Examples 1 to 9, may optionally further include wherein the processor is further configured to generate a message for the further automated machine based on the accuracy score.

In Example 11, the subject matter of any one of Examples 1 to 10, may optionally further include wherein the message comprises a task allocation.

In Example 12, the subject matter of any one of Examples 1 to 11, may optionally further include wherein the message comprises a machine learning model.

In Example 13, the subject matter of any one of Examples 1 to 12, may optionally further include wherein the message comprises a machine learning model.

In Example 14, the subject matter of any one of Examples 1 to 13, may optionally further include the processors configured to determine a decision vector based in part on the expected action and the accuracy score.

In Example 15, the subject matter of any one of Examples 1 to 14, may optionally further include the processors configured to determine a mission critical task.

In Example 16, the subject matter of any one of Examples 1 to 15, may optionally further include wherein the task allocation is based in part on the mission critical task.

In Example 17, the subject matter of any one of Examples 1 to 16, may optionally further include the processors configured to determine an accuracy score threshold; compare the accuracy score with the accuracy score threshold; and wherein the task allocation is based on the comparison.

In Example 18, the subject matter of any one of Examples 1 to 17, may optionally further include the processors configured to remove the further automated machine based in part on the accuracy score associated with the further automated machine.

In Example 19, the subject matter of any one of Examples 1 to 18, may optionally further include the processors configured to broadcast the accuracy score to the further automated machine.

In Example 20, the subject matter of any one of Examples 1 to 19, may optionally further include the processors configured to generate an accuracy table comprising the accuracy score.

In Example 21, the subject matter of any one of Examples 1 to 20, may optionally further include wherein the accuracy table is stored on a central device accessible by the automated machine and the further automated machine.

In Example 22, the subject matter of any one of Examples 1 to 21, may optionally further include, wherein a copy of the accuracy table is stored on the automated machine and the further automated machine.

In Example 23, the subject matter of any one of Examples 1 to 22, may optionally further include wherein a new automated machined joins the environment and downloads a copy of the accuracy table from the central device.

In Example 24, the subject matter of any one of Examples 1 to 23, may optionally further include wherein the accuracy score is determined using a reinforcement learning algorithm.

In Example 25, the subject matter of any one of Examples 1 to 24, may optionally further include wherein the task allocation is based on a collection of task allocations of the automated machine, further automated machine, and the new automated machine, wherein the collection of task allocations is based on the local copy of the accuracy score table of each automated machine.

In Example 26, the subject matter of any one of Examples 1 to 25, may optionally further include the task allocation is optimized for a highest available accuracy score.

In Example 27, a controller including a memory configured to store instructions; one or more processors coupled to the memory to execute the instructions stored in the memory, wherein the instructions are configured to detect an environment of an automated machine, wherein the environment comprises a further automated machine; determine an observed action of the further automated machine; determine an expected action of the further automated machine; compares the observed action with the expected action; and determine an accuracy score associated with the further automated machine based on the comparison.

In Example 28, the subject matter of Example 27, may optionally further include any one of the device of Examples 2 to 26.

In Example 29, a method including detecting an environment of an automated machine, wherein the environment comprises a further automated machine; determining an observed action of the further automated machine; determining an expected action of the further automated machine; comparing the observed action with the expected action; and determining an accuracy score associated with the further automated machine based on the comparison.

In Example 30, the subject matter of Example 29, may optionally further include allocating a task based on the accuracy score.

In Example 31, the subject matter of any one of Examples 29 or 30, may optionally further include wherein the automated machine is the further automated machine.

In Example 32, the subject matter of any one of Examples 29 to 31, may optionally further include wherein the task is allocated to the automated machine.

In Example 33, the subject matter of any one of Examples 29 to 32, may optionally further include wherein the task is allocated to the further automated machine.

In Example 34, the subject matter of any one of Examples 29 to 33, may optionally further include obtaining sensor measurements of the further automated machine.

In Example 35, the subject matter of any one of Examples 29 to 34, may optionally further include wherein the expected action is based in part on an environment condition.

In Example 36, the subject matter of any one of Examples 29 to 35, may optionally further include wherein the expected action is based in part on the sensor measurements of the further automated machine.

In Example 37, the subject matter of any one of Examples 29 to 36, may optionally further include wherein the accuracy score comprises information that a sensor of the further automated machine has failed.

In Example 38, the subject matter of any one of Examples 29 to 37, may optionally further include wherein generating a message for the further automated machine based on the accuracy score.

In Example 39, the subject matter of any one of Examples 29 to 38, may optionally further include wherein the message comprises a task allocation.

In Example 40, the subject matter of any one of Examples 29 to 39, may optionally further include wherein the message comprises a machine learning model.

In Example 41, the subject matter of any one of Examples 29 to 40, may optionally further include wherein the message comprises a machine learning model.

In Example 42, the subject matter of any one of Examples 29 to 41, may optionally further include determining a decision vector based in part on the expected action and the accuracy score.

In Example 43, the subject matter of any one of Examples 29 to 42, may optionally further include determining a mission critical task.

In Example 44, the subject matter of any one of Examples 29 to 43, may optionally further include wherein the task allocation is based in part on the mission critical task.

In Example 45, the subject matter of any one of Examples 29 to 44, may optionally further include determining an accuracy score threshold; compare the accuracy score with the accuracy score threshold; and wherein the task allocation is based on the comparison.

In Example 46, the subject matter of any one of Examples 29 to 45, may optionally further include removing the further automated machine based in part on the accuracy score associated with the further automated machine.

In Example 47, the subject matter of any one of Examples 29 to 46, may optionally further include broadcasting the accuracy score to the further automated machine.

In Example 48, the subject matter of any one of Examples 29 to 47, may optionally further include generating an accuracy table comprising the accuracy score.

In Example 49, the subject matter of any one of Examples 29 to 48, may optionally further include wherein the accuracy table is stored on a central device accessible by the automated machine and the further automated machine.

In Example 50, the subject matter of any one of Examples 29 to 49, may optionally further include, wherein a copy of the accuracy table is stored on the automated machine and the further automated machine.

In Example 51, the subject matter of any one of Examples 29 to 50, may optionally further include wherein a new automated machined joins the environment and downloads a copy of the accuracy table from the central device.

In Example 52, the subject matter of any one of Examples 29 to 51, may optionally further include wherein the accuracy score is determined using a reinforcement learning algorithm.

In Example 53, the subject matter of any one of Examples 29 to 52, may optionally further include wherein the task allocation is based on a collection of task allocations of the automated machine, further automated machine, and the new automated machine, wherein the collection of task allocations is based on the local copy of the accuracy score table of each automated machine.

In Example 54, the subject matter of any one of Examples 29 to 53, may optionally further include the task allocation is optimized for a highest available accuracy score.

In Example 55, a system including one or more devices according to Examples 1 28 configured to implement a method according to Examples 29 to 54.

In Example 56, one or more non-transitory computer readable media comprising programmable instructions thereon, that when executed by one or more processors of a device, cause the device to perform any one of the method of Examples 29 to 54.

In Example 57, a means for implementing any one of the Examples 1 to 28.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A controller comprising:
a processor configured to:
detect an environment in which a first automated machine and a second automated machine are located, wherein the first automated machine is affiliated with the second automated machine in a group;
determine an action taken in the environment by the second automated machine;
determine an action expected of the second automated machine;
compare the taken action with the expected action;
determine an accuracy score of the second automated machine based on the comparison, wherein the accuracy score comprises a static prediction of the expected action and a runtime result of the taken action, wherein the static prediction is based on a trained task performance model that predicts the expected action;
remove the second automated machine from affiliation in the group based on the accuracy score of the second automated machine and based on a deviation between the static prediction and the runtime result, wherein the deviation comprises an extent to which the static prediction deviates from the runtime result;
update the trained task performance model to an updated task performance model based on the deviation; and
control movements of the first automated machine or the second automated machine based on the updated task performance model.

2. The controller of claim 1, wherein the processor is further configured to allocate a task based on the accuracy score.

3. The controller of claim 2, wherein the task is allocated to the first automated machine.

4. The controller of claim 2, wherein the task is allocated to the second automated machine.

5. The controller of claim 2, wherein the processor is further configured to obtain results of a sensing process of the second automated machine.

6. The controller of claim 5, wherein the expected action is based in part on the results of the sensing process of the second automated machine.

7. The controller of claim 2, wherein the expected action is based in part on a condition of the environment.

8. The controller of claim 2, wherein the accuracy score comprises information of a sensor failure of the second automated machine.

9. The controller of claim 2, wherein the processor is further configured to generate a message for the second automated machine based on the accuracy score.

10. The controller of claim 2, wherein a copy of the accuracy table is stored on the first automated machine and the second automated machine.

11. The controller of claim 10, wherein the environment further comprises a third automated machine and wherein the first, second, and third automated machine each downloads a copy of the accuracy table from a central device, wherein the central device is configured to store the accuracy table and communicate with the first, second, and third automated machines.

12. The controller of claim 11, wherein the task allocation is based on a collection of task allocations of the first automated machine, second automated machine, and the third automated machine, wherein the collection of task allocations is based on the copy of the accuracy score table of first, second and third automated machines.

13. The controller of claim 1, wherein the first automated machine and the second automated machine are a same type of automated machine.

14. A non-transitory computer readable medium, having stored thereon, program instructions that when executed by a computing device, cause the computing device to perform operations comprising:
detecting an environment in which a first automated machine and a second automated machine are located, wherein the first automated machine is affiliated with the second automated machine in a group;
determining an action taken by the second automated machine;
determining an action expected of the second automated machine;
comparing the taken action with the expected action;
determining an accuracy score of the second automated machine based on the comparison, wherein the accuracy score comprises a static prediction of the expected action and a runtime result of the action taken, wherein the static prediction is based on a trained task performance model that predicts the expected action;
removing the second automated machine from affiliation in the group based on the accuracy score of the second automated machine and based on a deviation between the static prediction and the runtime result, wherein the deviation comprises an extent to which the static prediction deviates from the runtime result;
updating the trained task performance model based on the deviation;
controlling movements of the first automated machine or the second automated machine based on the updated trained task performance model.

15. The non-transitory computer readable medium of claim 14, further comprising allocating a task based on the accuracy score.

16. The non-transitory computer readable medium 15, wherein the first automated machine and the second machine are the same automated machine.

17. A device comprising:
means for detecting an environment in which a first automated machine and a second automated machine are located, wherein the first automated machine is affiliated with the second automated machine in a group;
means for determining an action taken by the second automated machine;
means for determining an action expected of the second automated machine;
comparing the taken action with the expected action;
means for determining an accuracy score of the second automated machine based on the comparison, wherein the accuracy score comprises a static prediction of the expected action and a runtime result of the action taken, wherein the static prediction is based on a trained task performance model that predicts the expected action; and
a means for removing the second automated machine from affiliation in the group based on the accuracy score of the second automated machine and based on a deviation between the static prediction and the runtime result, wherein the deviation comprises an extent to which the static prediction deviates from the runtime result;

a means for updating the trained task performance model to an updated task performance model based on the deviation;

a means for controlling movements of the first automated machine or the second automated machine based on the updated task performance model.

18. The device of claim 17, further comprising a means for allocating a task based on the accuracy score.

19. The device of claim 17, further comprising obtaining results of a sensing process of the second automated machine.

* * * * *